United States Patent
Okada

(10) Patent No.: US 9,648,177 B2
(45) Date of Patent: May 9, 2017

(54) REMOTE CONTROL APPARATUS, REMOTE CONTROL METHOD, AND NON-TRANSITORY COMPUTER-READABLE RECORDING MEDIUM ENCODED WITH REMOTE CONTROL PROGRAM

(71) Applicant: Konica Minolta Inc., Chiyoda-ku, Tokyo (JP)

(72) Inventor: Tatsunori Okada, Nagaokakyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/980,372

(22) Filed: Dec. 28, 2015

(65) Prior Publication Data
US 2016/0191729 A1 Jun. 30, 2016

(30) Foreign Application Priority Data
Dec. 24, 2014 (JP) ................ 2014-261407

(51) Int. Cl.
G06F 15/00 (2006.01)
H04N 1/00 (2006.01)
G06F 3/12 (2006.01)

(52) U.S. Cl.
CPC ....... *H04N 1/00307* (2013.01); *G06F 3/1205* (2013.01); *G06F 3/1253* (2013.01);
(Continued)

(58) Field of Classification Search
CPC combination set(s) only.
See application file for complete search history.

(56) References Cited

U.S. PATENT DOCUMENTS

2012/0069380 A1* 3/2012 Sugimoto ............ G06F 3/1205
358/1.14
2013/0100497 A1 4/2013 Amiya et al.
(Continued)

FOREIGN PATENT DOCUMENTS

JP 2012-093940 A 5/2012
JP 2013-088729 A 5/2013
(Continued)

OTHER PUBLICATIONS

Notice of Ground of Rejection issued Mar. 28, 2017, by the Japanese Patent Office in corresponding Japanese Patent Application No. 2014-261407, with an English translation of the Notice (17 pages).

*Primary Examiner* — Saeid Ebrahimi Dehkord
(74) *Attorney, Agent, or Firm* — Buchanan Ingersoll & Rooney PC

(57) ABSTRACT

A remote control apparatus includes a communication unit that communicates with a remote operation device and an apparatus-side controller. The apparatus-side controller includes an operation screen determining portion configured to determine an operation screen transmitted to the remote operation device, a page display information producing portion configured to produce page display information including a description to describe a display of an operation screen with a display mode of contents being capable of changing when the operation screen includes the contents of which the display mode is capable of changing in a predetermined variable region, a first transmitting portion configured to transmit the image of the operation screen to the remote operation device when the operation screen does not include the variable region, and a second transmitting portion configured to transmit the produced page display infor-
(Continued)

mation to the remote operation device when the determined operation screen includes the variable region.

22 Claims, 16 Drawing Sheets

(52) U.S. Cl.
CPC ....... *G06F 3/1292* (2013.01); *H04N 1/00204* (2013.01); *H04N 2201/0094* (2013.01)

(56) References Cited

U.S. PATENT DOCUMENTS

| 2013/0127688 | A1 | 5/2013 | Amiya et al. |
| 2014/0168698 | A1 | 6/2014 | Okada |

FOREIGN PATENT DOCUMENTS

| JP | 2013-109565 A | 6/2013 |
| JP | 2013-186665 A | 9/2013 |
| JP | 2014-120017 A | 6/2014 |
| JP | 2014-120916 A | 6/2014 |

* cited by examiner

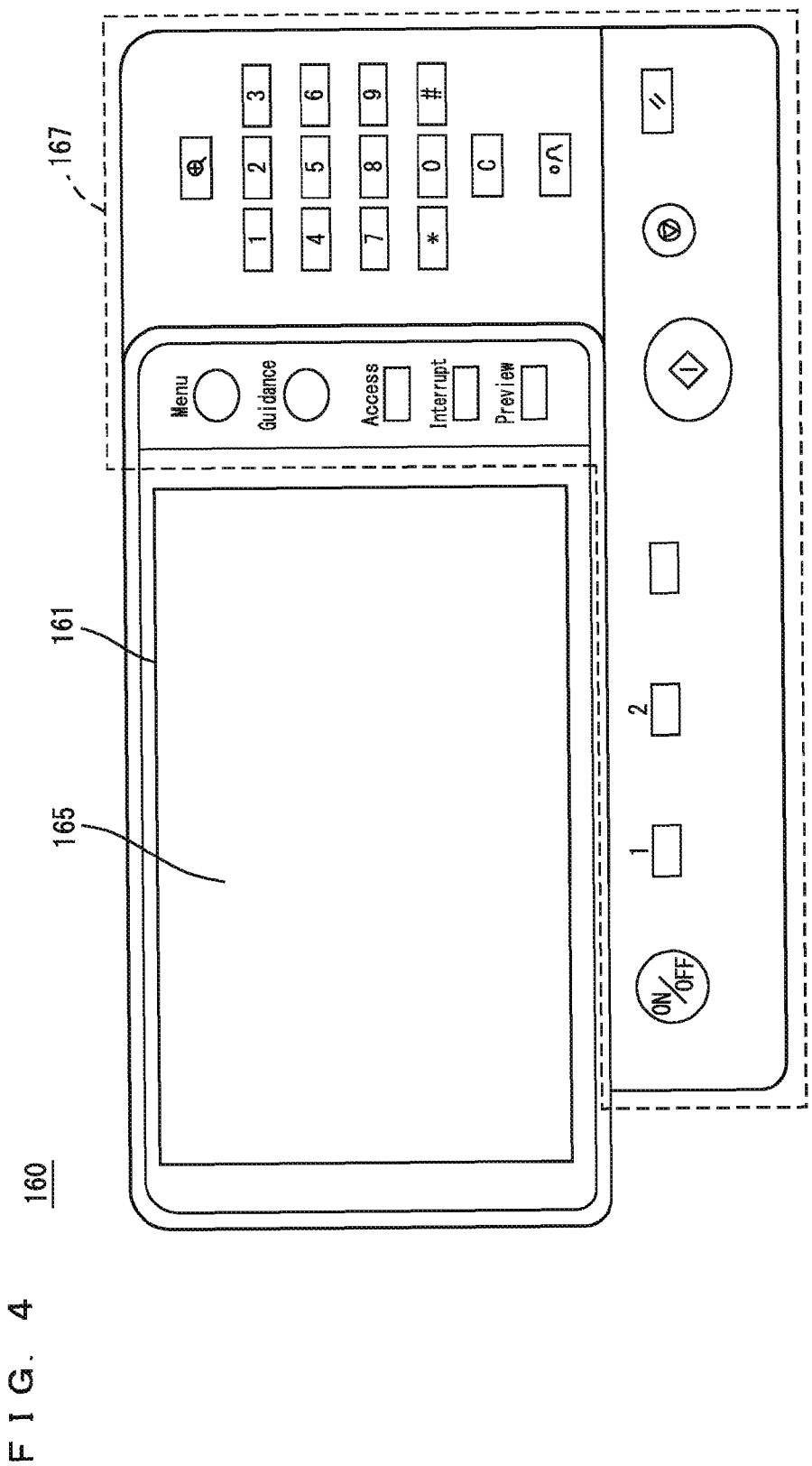
F I G. 4

| SELECT A JOB TO PRINT | NUMBER OF COPIES 1 |

LIST OF JOBS

AAA001.doc
AAA002.doc
AAA003.doc
AAA004.doc
AAA005.doc 505        507

AAA001.doc
AAA002.doc
AAA003.doc      511
AAA004.doc
AAA005.doc
AAA006.doc
AAA007.doc
AAA008.doc
AAA009.doc
AAA0010.doc

REMOTE CONTROL APPARATUS, REMOTE CONTROL METHOD, AND NON-TRANSITORY COMPUTER-READABLE RECORDING MEDIUM ENCODED WITH REMOTE CONTROL PROGRAM

This application is based on Japanese Patent Application No. 2014-261407 filed with Japan Patent Office on Dec. 24, 2014, the entire content of which is hereby incorporated by reference.

BACKGROUND OF THE INVENTION

Field of the Invention

The present invention relates to a remote control apparatus, a remote control method, and a non-transitory computer-readable recording medium encoded with a remote control program. More specially, the present invention relates to the remote control apparatus remotely controlled by a remote operation device, the remote control method performed by the remote control apparatus, and the remote control program executed by a non-transitory computer-readable recording medium encoded with the remote control apparatus.

Description of the Related Art

In recent years, a technique for remotely operating a Multi Function Peripheral (MFP) using a portable information device such as a smart phone, a tablet terminal has been known. An operation screen for operating the MFP can be displayed on the portable information device, and the MFP can be remotely operated by the portable information device. For example, Japanese Patent Laid-Open No. 2012-93940 describes a remote operation system that includes a subject terminal of operation including a display screen control portion that produces a portable terminal screen in which a screen of the subject terminal of operation is corrected based on display attribute information of the portable terminal, an encoding portion that encodes the portable terminal screen by an encoding system received from the portable terminal, and an operation executing portion that executes an operation specified by position information received from the portable terminal, and the portable terminal including an encrypting portion that encrypts the encoded portable terminal screen and outputs the encrypted portable terminal screen to a touch screen, and a position information correcting portion that corrects position information indicating a touch position on the portable terminal screen to position information in the screen of the subject terminal of operation based on its own display attribute information and display attribute information of subject terminal of operation received from the subject terminal of operation in the case where detecting a touch operation on the touch screen displaying the portable terminal screen.

However, the operation screen displayed by the MFP sometimes includes a region in which contents of display change, for example, such as a case in which the operation screen includes a region displayed to be scrollable. In this case, in the case where a portable information device accepts a scroll operation for an operation screen received from the MFP, it is necessary that the MFP transmits an operation screen being scrolled and an operation screen after being scrolled to the portable information device in addition to an operation screen before being scrolled. Thus, an amount of data for transmission and reception unfortunately increases.

SUMMARY OF THE INVENTION

According to an aspect of the present invention, a remote control apparatus capable of being remotely controlled by a remote operation device includes a communication unit that communicates with the remote operation device, and an apparatus-side controller, wherein the apparatus-side controller includes an operation screen determining portion configured to determine an operation screen to be transmitted to the remote operation device, a page display information producing portion configured to, in the case where the determined operation screen includes contents of which a display mode is capable of changing in a variable region predetermined in the operation screen, produce page display information including a description to describe a display of the determined operation screen with the display mode of the contents being capable of changing, a first transmitting portion configured to, in the case where the determined operation screen does not include the variable region, control the communication unit to transmit an image of the determined operation screen to the remote operation device, and a second transmitting portion configured to, in the case where the determined operation screen includes the variable region, control the communication unit to transmit the produced page display information to the remote operation device.

According to another aspect of the present invention, a remote control method performed by a remote control apparatus capable of being remotely controlled by a remote operation device includes an operation screen determination step of determining an operation screen transmitted to the remote operation device, a page display information production step of, in the case where the determined operation screen includes contents of which the display mode is capable of changing in a variable region predetermined in the operation screen, producing page display information including a description to describe a display of the determined operation screen with the display mode of contents being capable of changing, a first transmission step of, in the case where the determined operation screen does not include the variable region, transmitting the image of the determined operation screen to the remote operation device, and a second transmission step of, in the case where the determined operation screen includes the variable region, transmitting the produced page display information to the remote operation device.

According to a further aspect of the present invention, a non-transitory computer-readable recording medium encoded with a remote control program, wherein the remote control program allows a computer that controls a remote control apparatus capable of being remotely controlled by a remote operation device to perform following steps, the steps include an operation screen determination step of determining an operation screen transmitted to the remote operation device, a page display information production step of, in the case where the determined operation screen includes contents of which the display mode is capable of changing in a variable region predetermined in the operation screen, producing page display information including a description to describe a display of the determined operation screen with a display mode of the contents being capable of changing, a first transmission step of, in the case where the determined operation screen does not include the variable region, transmitting the image of the determined operation screen to the remote operation device, and a second transmission step of, in the case where the determined operation screen includes the variable region, transmitting the produced page display information to the remote operation device.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 4 is a plan view showing one example of an operation panel.

FIG. 8 is a diagram showing one example of an image of an operation screen including a variable region.

FIG. 9 is a diagram showing one example of an image of contents.

DESCRIPTION OF THE PREFERRED EMBODIMENTS

Figure 1:
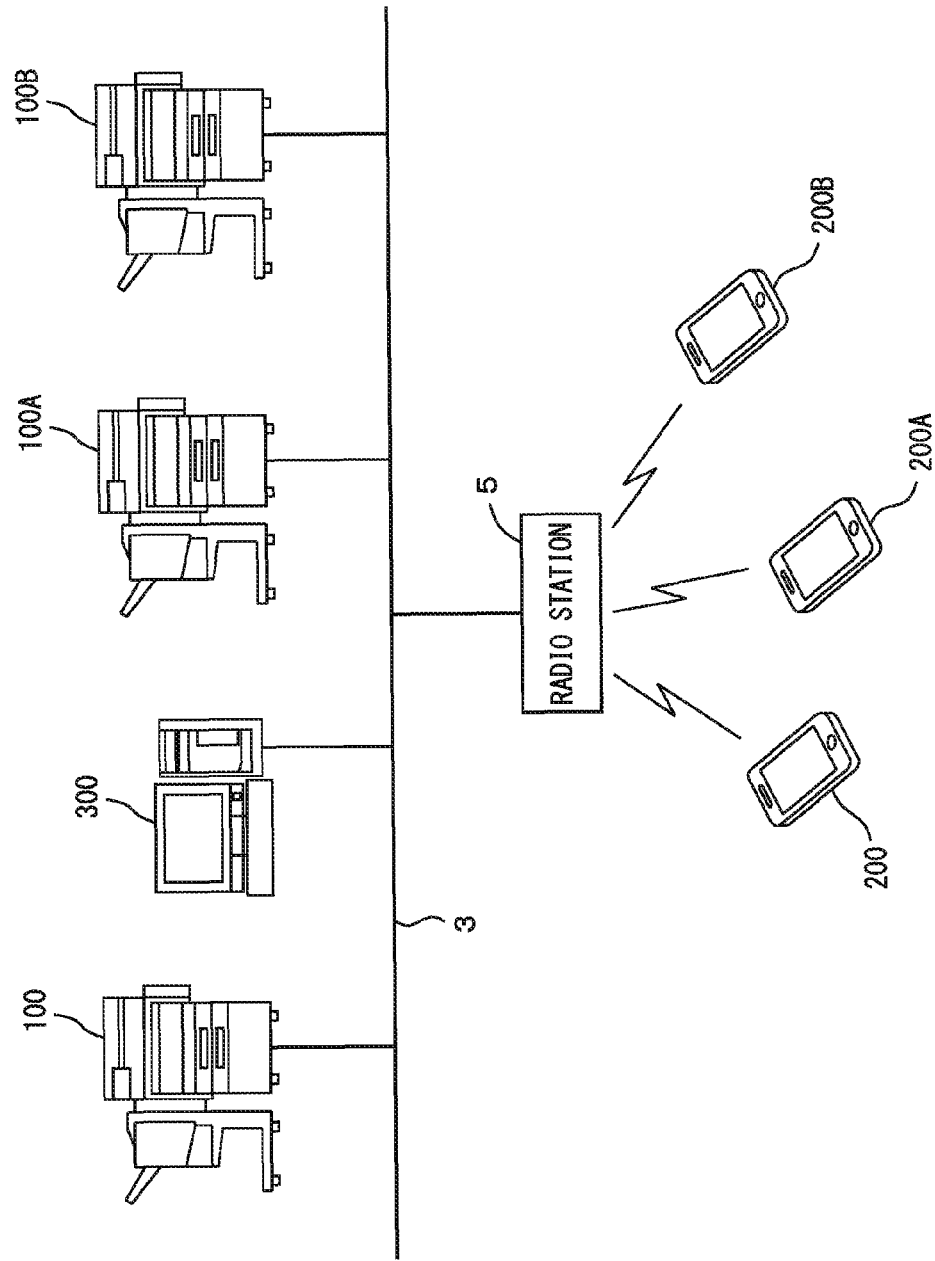
FIG. 1 is a diagram showing an overview of a print system in one of embodiments of the present invention.

Embodiments of the present invention will be described below with reference to drawings. In the following description, the same parts are denoted with the same reference numerals. Their names and functions are also the same. A detailed description thereof is therefore not repeated.

FIG. 1 is a diagram showing an overview of a print system in one embodiment of the present invention. Referring to FIG. 1, the print system 1 includes Multi Function Peripherals (hereinafter referred to as "MFPs") 100, 100A, 100B that function as remote control devices, a personal computer (hereinafter referred to as a "PC") 300, a radio station 5, and portable information devices 200, 200A, 200B. The MFPs 100, 100A, 100B, the PC 300, and the radio station 5 are connected to a network 3. The portable information devices 200, 200A, 200B are connected to the network 3 via the radio station 5.

The network 3 is a Local Area Network (LAN), either wired or wireless. Further, the network 3 is not limited to the LAN and may be a Wide Area Network (WAN), a Public Switched Telephone Network (PSTN), the internet or the like.

The PC 300 is a general computer. A printer driver program compatible with the MFPs 100, 100A, 100B is installed in the PC 300. The PC 300 can control the MFPs 100, 100A, 100B and allow the MFPs 100, 100A, 100B to execute an image forming process, a document scanning process and the like by executing the printer driver program.

The MFPs 100, 100A, 100B have the same hardware configurations and functions, and the MFP 100 will be taken as an example here, unless otherwise specified. The MFPs 100, 100A, 100B can cooperatively execute processes by communicating with one another, so that a user can operate without paying attention to distinction among the MFPs 100, 100A, 100B. For example, a job transmitted from the PC 300 to the MFP 100A by the operation of the PC 300 by the user is temporarily stored in the MFP 100A. Thereafter, in the case where the user operates the MFP 100, the MFP 100 inquires presence or absence of the job of the user who has logged in the MFP 100 and acquires job identification information of the job transmitted from the PC 300 to the MFP 100A by the user to notify the user of the job identification information of the job. If the user selects the job identification information and gives an instruction to print, the MFP 100 acquires the job from the MFP 100A for printing.

The portable information devices 200, 200A, 200B are computers such as smart phones or PDAs (Personal Digital Assistants) carried by users. The portable information devices 200, 200A, 200B have the same hardware configurations and functions, and the portable information device 200 will be taken as an example here, unless otherwise specified. The portable information device 200 is a smart phone and has a wireless LAN function and a call function. Therefore, the portable information device 200 can wirelessly communicate with a mobile phone base station and connect to a mobile phone network to make a call.

In the print system 1 according to the present embodiment, each of the portable information devices 200, 200A, 200B remotely operates the MFPs 100, 100A, 100B. In this case, each of the portable information devices 200, 200A, 200B functions as a remote operation device that remotely controls the MFPs 100, 100A, 100B, and each of the MFP 100, 100A, 100B functions as a remote control apparatus remotely controlled by any of the portable information devices 200, 200A, 200B. A remote operation program for remotely controlling the MFPs 100, 100A, 100B is installed in each of the portable information devices 200, 200A, 200B. The remote operation program is common to the MFPs 100, 100A, 100B and is an application program compatible with any of the MFPs 100, 100A, 100B. On the one hand, a remote control program that is remotely controlled by the portable information device 200 and executes processes is installed in the MFP 100. An example in which the portable information device 200 remotely controls the MFP 100 will be described.

In the present embodiment, a case in which the remote operation program for remotely controlling the MFPs 100, 100A, 100B is installed in the portable information device 200 will be described, by way of example. However, the remote operation program for remotely controlling the MFPs 100, 100A, 100B may be installed in the PC 300. In this case, the user can remotely control the MFPs 100, 100A, 100B using the PC 300 similarly to a case in which the MFPs 100, 100A, 100B are remotely controlled using the portable information device 200.

Figure 2:
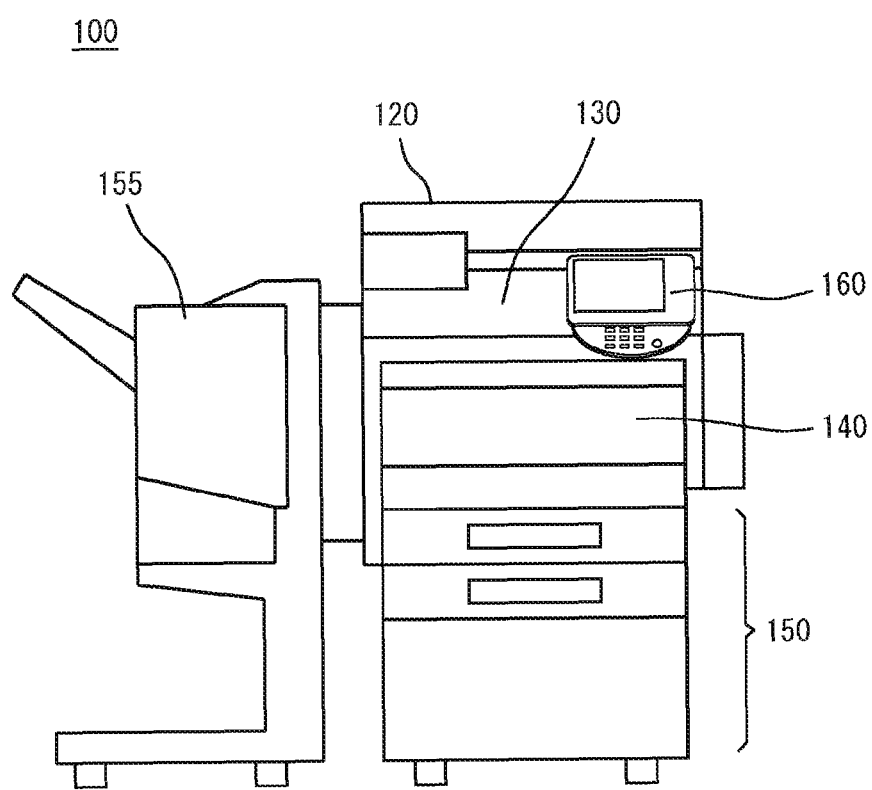
FIG. 2 is a perspective view showing an appearance of an MFP.
Figure 3:
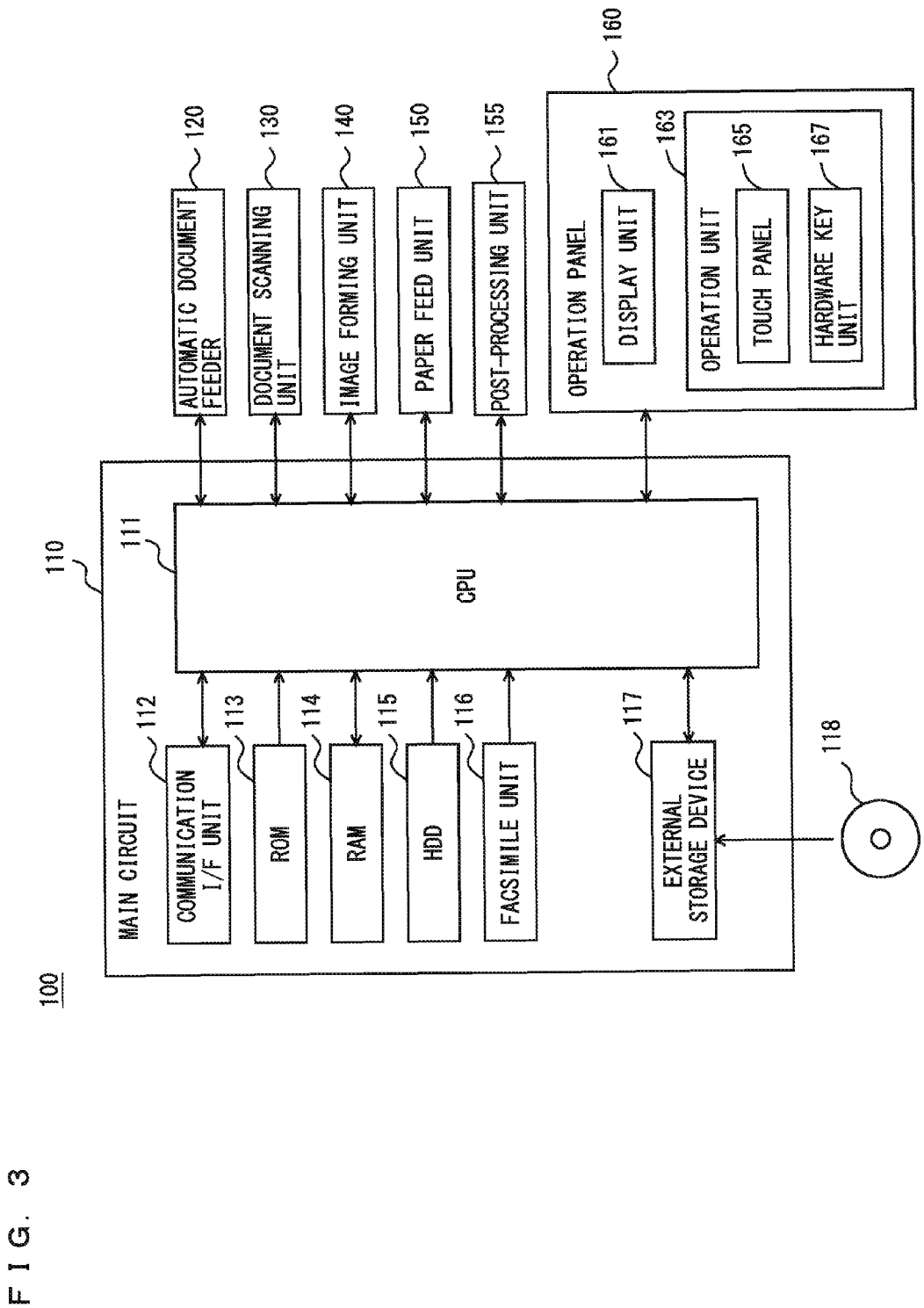
FIG. 3 is a block diagram showing an outline of hardware configurations of the MFP.

FIG. 2 is a perspective view showing an appearance of an MFP. FIG. 3 is a block diagram showing an outline of hardware configurations of the MFP. Referring to FIGS. 2 and 3, the MFP 100 includes a main circuit 110, a document scanning unit 130 for scanning a document, an automatic document feeder 120 for conveying a document to document scanning unit 130, an image forming unit 140 for forming an image on paper or other medium based on image data output by the document scanning unit 130 scanning a document, a paper feed unit 150 for supplying paper to the image forming unit 140, and a post-processing unit 155 for processing paper on which an image is formed, and an operation panel 160 serving as a user interface.

The post-processing unit 155 executes a sorting process of rearranging and ejecting paper of more than 0 on which an image is formed by the image forming unit 140, a punching process of punching holes into the paper, and a stapling process of putting staples into the paper.

The main circuit 110 includes a CPU 111, a communication interface (I/F) unit 112, a ROM 113, a RAM 114, and a hard disk drive (HDD) 115 used as a mass storage device, a facsimile unit 116, and an external storage device 117 to which a CD-ROM 118 is attached. The CPU 111 is connected to the automatic document feeder 120, the document scanning unit 130, the image forming unit 140, the paper feed unit 150, the post-processing unit 155, and the operation panel 160 and controls the entire MFP 100.

The ROM 113 stores a program executed by the CPU 111 or data necessary for executing the program. The RAM 114 is used as a work area when the CPU 111 executes the program. Further, the RAM 114 includes a setting value storage region and a setting screen storage region. The setting value storage region is a region that stores setting values for executing processes. The setting screen storage region is a region that stores setting screens displayed on a display unit 161. Further, the RAM 114 temporarily stores scan data (image data) successively sent from the document scanning unit 130.

The Communication I/F unit 112 is an interface for connecting the MFP 100 to the network 3. The CPU 111 communicates with the PC 300, the portable information devices 200, 200A, 200B via the communication I/F unit 112 to transmit and receive data. Further, the communication I/F unit 112 can communicate with a computer connected to the internet via the network 3.

The facsimile unit 116 is connected to a Public Switched Telephone Network (PSTN) to transmit facsimile data to the PSTN or receive facsimile data from the PSTN. The facsimile unit 116 stores the received facsimile data in the HDD 115 or outputs the received facsimile data to the image forming unit 140. The image forming unit 140 prints the facsimile data received from the facsimile unit 116 on paper. Further, the facsimile unit 116 converts data stored in the HDD 115 into facsimile data and transmits the converted facsimile data to a facsimile machine connected to the PSTN.

The CD-ROM (Compact Disk ROM) 118 is attached to the external storage device 117. The CPU 111 can access the CD-ROM 118 via the external storage device 117. The CPU 111 loads a program recorded on the CD-ROM 118 attached to the external storage device 117 into the RAM 114 for execution. The program executed by the CPU 111 can be stored not only in the CD-ROM 118 but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by the CPU 111 is not limited to a program recorded on the CD-ROM 118. A program stored in the HDD 115 may be loaded into the RAM 114 for execution. In this case, another computer connected to the network 3 may overwrite the program stored in the HDD 115 of the MFP 100 or additionally write a new program. Further, the MFP 100 may download a program from another computer connected to the network 3 and store the program in the HDD 115. The program referred to here includes not only a program directly executable by the CPU 111 but also a source program, a compressed program, and an encrypted program.

The operation panel 160 is provided on an upper surface of the MFP 100. FIG. 4 is a plan view showing one example of an operation panel. A dotted line in FIG. 4 is provided to show a hardware key unit 167 and does not actually exist. Referring to FIGS. 3 and 4, the operation panel 160 includes the display unit 161 and an operation unit 163. The display unit 161 is a liquid crystal display (LCD), for example, and displays instruction menus to the user or information about the acquired image data.

The operation unit 163 includes a touch panel 165 and the hardware key unit 167. The touch panel 165 is superimposed on an upper surface or a lower surface of the display unit 161. The hardware key unit 167 includes a plurality of hardware keys. The hardware keys are contact switches, for example. The touch panel 165 detects a position designated by the user in the display surface of the display unit 161. In the case where operating the MFP 100, the user is likely to be in an upright attitude, so that the display surface of the display unit 161, an operation surface of the touch panel 165 and the hardware key unit 167 are arranged to face upward. This is for the purpose of enabling the user to easily view the display surface of the display unit 161 and easily give an instruction on the operation unit 163 with his or her finger.

Figure 5:
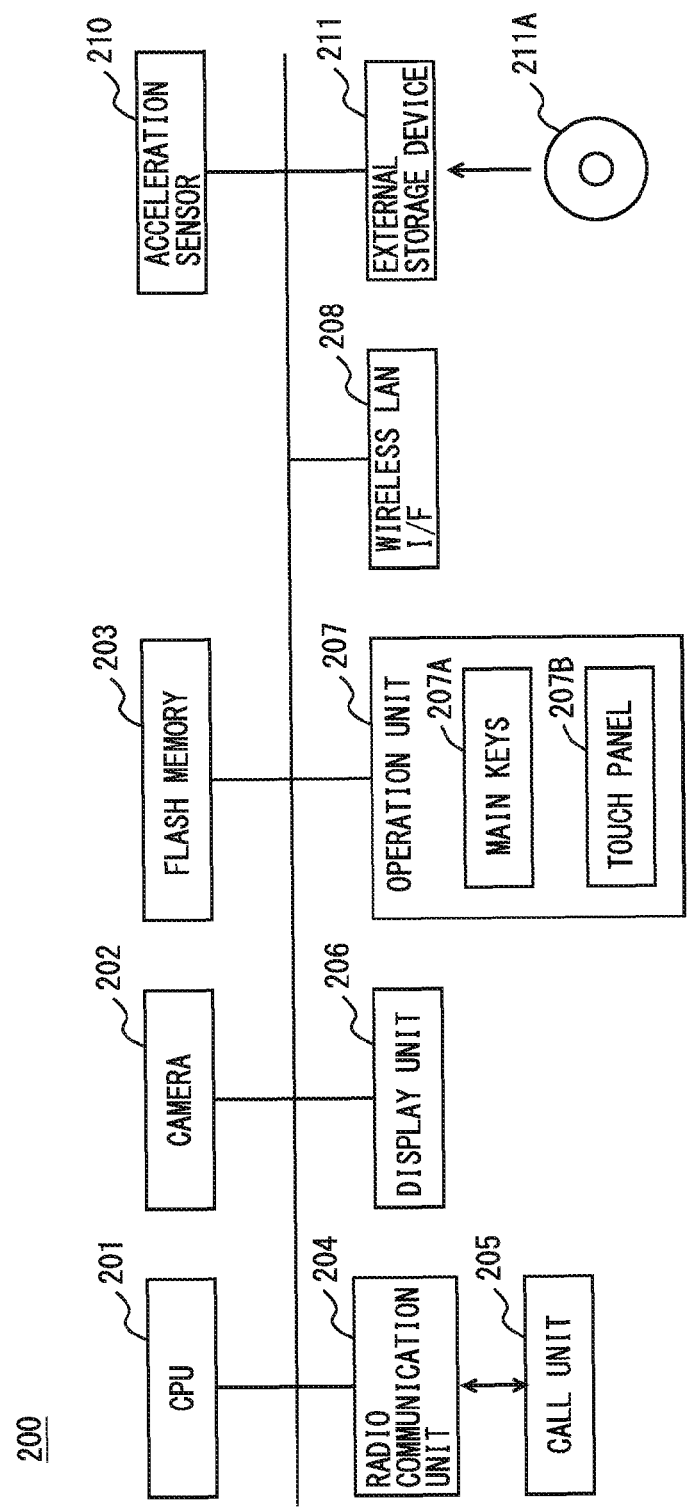
FIG. 5 is a block diagram showing an outline of hardware configurations of a portable information device.

FIG. 5 is a block diagram showing an outline of hardware configuration of the portable information device. Referring to FIG. 5, the portable information device 200 in the present embodiment includes a CPU 201 for controlling the entire portable information device 200, a camera 202, a flash memory 203 for storing data in a nonvolatile manner, a radio communication unit 204 connected to a call unit 205, a display unit 206 displaying information, an operation unit 207 accepting input of an operation by the user, a wireless LAN I/F 208, an acceleration sensor 210, and an external storage device 211.

The display unit 206 is a display device such as an LCD (Liquid Crystal Display) and an organic ELD and displays instruction menus to the user, information about the acquired image data and the like. The operation unit 207 includes main keys 207A and a touch panel 207B. Further, in the case where the user gives an instruction on the display surface of the display unit 206, the operation unit 207 outputs a position on the display surface detected by the touch panel 207B to the CPU 201. The CPU 201 detects the position designated by the user in the screen displayed in the display unit 206 based on the position detected by the touch panel 207B. The CPU 201 accepts input of a variety of instructions and data such as characters and numerals based on the screen displayed in the display unit 206 and the position detected by the touch panel 207B. For example, in the case where a screen including an image of numeric keys is displayed in the display unit 206, the CPU 201 accepts a numeral corresponding to a key displayed at a position detected by the touch panel 207B.

The camera 202 includes a lens and an optoelectronic transducer, and light collected by the lens is imaged on the optoelectronic transducer. The optoelectronic transducer transduces the received light and outputs image data to the CPU 201. The optoelectronic transducer is a CMOS (Complementary Metal Oxide Semiconductor) sensor, a CCD (Charge Coupled Device) sensor or the like.

The radio communication unit 204 communicates by radio with a mobile phone base station connected to a telephone communication network. The radio communication unit 204 connects the portable information device 200 to the telephone communication network to enable a call using the call unit 205. The radio communication unit 204 decodes a voice signal obtained by demodulating a radio signal received from the mobile phone base station and outputs the decoded signal to the call unit 205. Further, the radio communication unit 204 encodes voice input from the call unit 205 and transmits the encoded signal to the mobile phone base station. The call unit 205 includes a microphone and a speaker. Voice input from the radio communication unit 204 is output from the speaker, and voice input from the microphone is output to the radio communication unit 204. Further, the radio communication unit 204 is controlled by the CPU 201 and connects the portable information device 200 to an electric mail server to receive and send electric mails.

The Wireless LAN I/F 208 is an interface that communicates with the radio station 5 and connects the portable information device 200 to the network 3. Respective IP (Internet Protocol) addresses for the respective PC 300, the MFPs 100, 100A, 100B are registered in the portable information device 200, whereby the portable information device 200 can communicate with the PC 300, the MFPs 100, 100A, 100B to transmit and receive data. In the present embodiment, an example in which the portable information device 200 communicates with the PC 300, the MFPs 100, 100A, 100B using the wireless LAN I/F 208 is described. However, the portable information device 200 may use another method of communication. Specifically, in the case where the portable information devices 200, the PC 300, the MFPs 100, 100A, 100B include short-range wireless communication devices such as Bluetooth (registered trademark), the portable information device 200 may establish a one-to-one correspondence to communicate with any of the PC 300, the MFPs 100, 100A, 100B.

The flash memory 203 stores a program executed by the CPU 201 or necessary data for executing the program. The CPU 201 loads the program recorded in the flash memory 203 into the RAM included in the CPU 201 for execution.

The acceleration sensor 210 is a three-axis acceleration sensor that measures acceleration in 3 directions of an X axis, a Y axis and a Z axis. The acceleration sensor 210 outputs the detected acceleration to the CPU 201.

The external storage device 211 is removably attached to the portable information device 200. A CD-ROM 211A storing a remote operation program can be attached to the external storage device 211. The CPU 201 can access the CD-ROM 211A via the external storage device 211. The CPU 201 can load the remote operation program recorded in the CD-ROM 211A attached to the external storage device 211 into the RAM included in the CPU 201 for execution.

The program recorded in the flash memory 203 or the CD-ROM 210A has been described as a program executed by the CPU 201. However, another computer connected to the network 3 may overwrite the program stored in flash memory 203 or additionally write a new program. The portable information device 200 may download a program from another computer connected to the network 3. The program referred to here includes not only a program directly executable by the CPU 201 but also a source program, a compressed program, and an encrypted program.

The program executed by the CPU 201 may be stored not only in the CD-ROM 211A but also in another medium such as an optical disk (MO/MD/DVD), an IC card, an optical card, and a semiconductor memory such as a mask ROM, an EPROM, and an EEPROM.

Figure 6:
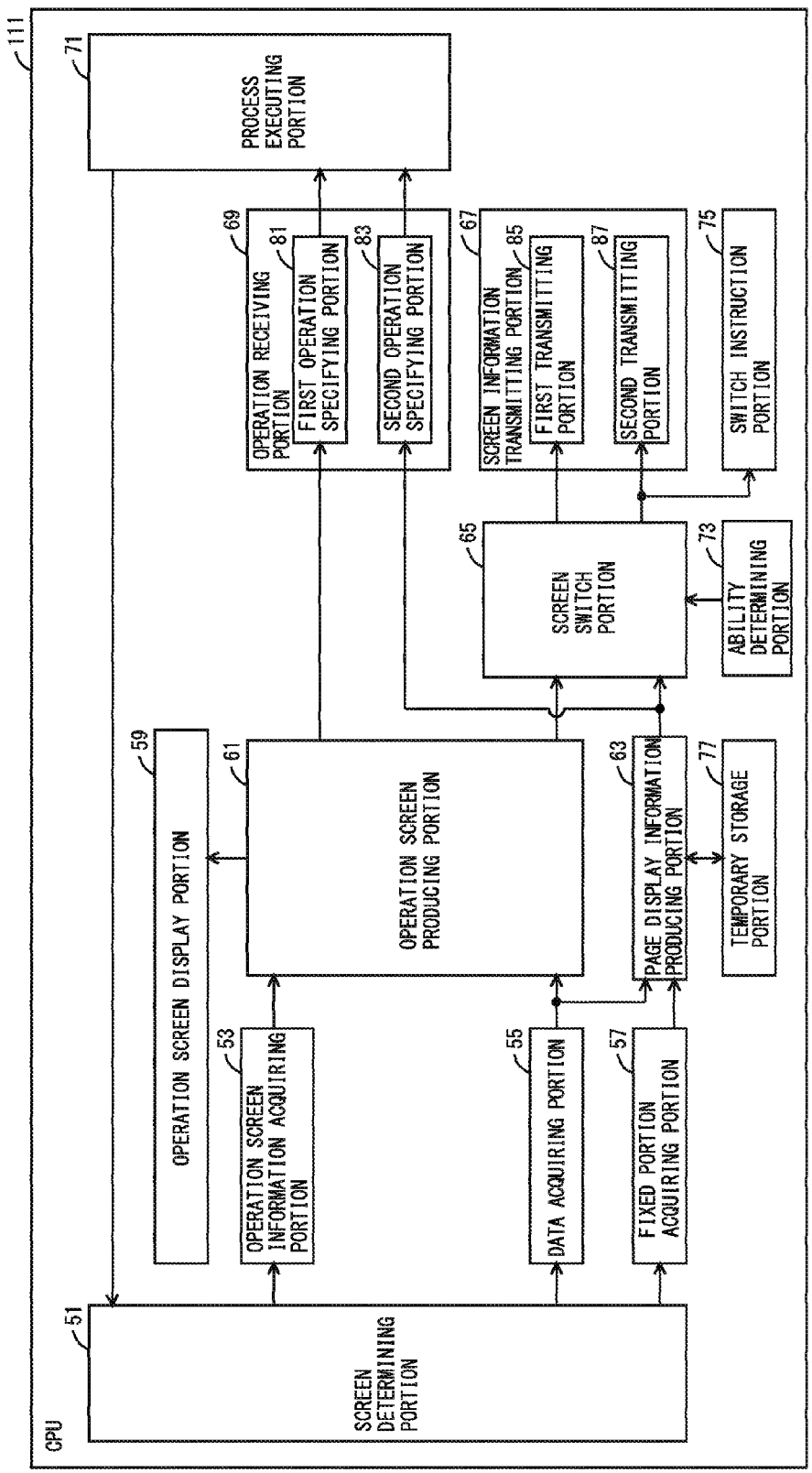
FIG. 6 is a block diagram showing one example of functions of a CPU included in the MFP.

FIG. 6 is a block diagram showing one example of functions of a CPU included in an MFP. The functions shown in FIG. 6 are formed in the CPU 111 by the execution of the remote control program stored in the ROM 113, the HDD 115, the CD-ROM 118 by the CPU 111 included in the MFP 100. Referring to FIG. 6, the CPU 111 includes a screen determining portion 51, an operation screen information acquiring portion 53, a data acquiring portion 55, a fixed portion acquiring portion 57, an operation screen display portion 59, an operation screen producing portion 61, a page display information producing portion 63, a screen switch portion 65, a screen information transmitting portion 67, an operation receiving portion 69, a process executing portion 71, an ability determining portion 73, a switch instructing portion 75, and a temporary storage portion 77.

The screen determining portion 51 determines an operation screen, which any of the portable information devices 200, 200A, 200B is allowed to display. For example, when controlling the communication I/F unit 112 and receiving a connection request from any of the portable information devices 200, 200A, 200B, the screen determining portion 51 determines a predetermined operation screen. When determining the operation screen, the screen determining portion 51 outputs screen identification information for identifying the determined operation screen to the operation screen information acquiring portion 53, the data acquiring portion 55, and the fixed portion acquiring portion 57.

In response to input of the screen identification information from the screen determining portion 51, the operation screen information acquiring portion 53 acquires operation screen information stored in the HDD 115 in advance. The operation screen information includes an image of an operation screen. The operation screen sometimes includes contents of which a display mode is capable of changing in a variable region predetermined in the operation screen. For example, the operation screen includes the contents displaying a list of titles of a plurality of jobs in the variable region to be scrollable, the contents displaying another operation screen in a pop-up screen in the variable region, and the contents of a video image such as animation for explaining details of an operation. In the case where the operation screen includes the contents of which the display mode is capable of changing in the variable region, the operation screen information includes position information indicating a position of the variable region in the operation screen and display control information indicating a method of displaying the contents. The operation screen information acquiring portion 53 outputs the image of the operation screen included in the acquired operation screen information to the operation screen producing portion 61. In the case where the operation screen information includes the position information and the display control information, the operation screen information acquiring portion 53 outputs the position information and the display control information to the data acquiring portion 55.

The data acquiring portion 55 receives the position information and the display control information from the operation screen information acquiring portion 53. The display control information includes data specific information that specifies data included in the contents and mode specific information that specifies a display mode in which the data is displayed. In the case where the data is fixed, the data specific information includes data identification information for identifying the data. In the case where the data is not fixed, the data specific information includes information for producing the data. The data acquiring portion 55 acquires the data included in the contents based on the data specific information and outputs a set of the acquired data, the mode specific information and the position information to the operation screen producing portion 61 and the page display information producing portion 63.

If the data specific information is the data identification information, the data acquiring portion 55 acquires the data specified by the data specific information as the data included in the contents. For example, if the data identification information specifies video image data, the data acquiring portion 55 acquires the video image data as the data included in the contents. If the data specific information specifies a condition for producing the data, the data acquiring portion 55 acquires the data in accordance with the condition. In the case where the data included in the contents is a list of jobs associated with the user, the information for producing the data includes the jobs accumulated in the MFPs 100, 100A, 100B as targets of search and the user identification information for identifying the user as a search key, as the conditions for producing the data. The data acquiring portion 55 acquires a job associated with the user identification information which is the search key among the jobs accumulated in each of the MFPs 100, 100A, 100B and acquires the job identification information of the acquired job as the data of the contents. The user identification information is information for identifying the user who operates the portable information device 200, which is the remote control apparatus. Further, in the case where the data included in the contents is a history of jobs that has been executed by the MFP 100, the information for producing the data includes a name of a folder that stores the history of the jobs as the condition for producing the data. The data acquiring portion 55 acquires the history of the jobs stored in the folder specified by the name of the holder as the data of the contents.

The operation screen producing portion 61 receives an image of an operation screen from the operation screen information acquiring portion 53. Further, the operation screen producing portion 61 sometimes receives a set of data, mode specific information and position information from the data acquiring portion 55. In the case where not receiving a set of data, mode specific information and position information from the data acquiring portion 55, the operation screen producing portion 61 outputs an image of an operation screen input from the operation screen information acquiring portion 53 to the operation screen display portion 59 and a first operation specifying portion 81 of the operation receiving portion 69.

In the case where receiving the image of the operation screen from the operation screen information acquiring portion 53 and the set of data, the mode specific information and the position information from the data acquiring portion 55, the operation screen producing portion 61 produces an operation screen by arranging the data in a mode defined by the mode specific information in a variable region specified by the position information. The operation screen producing portion 61 outputs the produced image of the operation screen to the operation screen display portion 59, the screen switch portion 65 and the first operation specifying portion 81 of the operation receiving portion 69. Because the variable region changes, the operation screen producing portion 61 outputs a changed image of the operation screen to the operation screen display portion 59, the screen switch portion 65 and the first operation specifying portion 81 of the operation receiving portion 69 every time the image of the operation screen changes.

The mode specific information includes scroll display, pop-up display and video display, for example. For example, in the case where the mode specific information is the scroll display and data is the job identification information, the operation screen producing portion 61 arranges a list of the job identification information that can be displayed in a scroll screen in the variable region. Further, in the case where the mode specific information is the pop-up display and the data is a history of jobs, the operation screen producing portion 61 arranges the history of the jobs that can be displayed in a pop-up screen in the variable region. Further, in the case where the mode specific information is the video display and the data is video image data, the operation screen producing portion 61 arranges a playback image of the video data in the variable region.

In response to input of the screen identification information from the screen determining portion 51, the fixed portion acquiring portion 57 acquires a fixed portion associated in advance with the operation screen specified by the screen identification information. The fixed portion acquiring portion 57 outputs a set of the acquired fixed portion and screen identification information to the page display information producing portion 63. The fixed portion is not present in the operation screen not including the variable region. Therefore, even in the case where receiving screen identification information from the screen determining portion 51, if a fixed portion cannot be acquired, the fixed portion acquiring portion 57 does not output anything to the page display information producing portion 63.

The fixed portion includes a description to describe a display of a fixed region other than a variable region in the operation screen including the variable region. For example, the fixed portion is described in data description language such as mark-up language. The mark-up language includes HTML (Hyper Text Markup Language) and XML (Extensible Markup Language). A case in which page display information is data described in HTML will be described, by way of example. The fixed portion is common to the MFPs 100, 100A, 100B and is stored in any of the MFPs 100, 100A, 100B. For example, in the case where the MFP 100A stores the fixed portion, the fixed portion is acquired from the MFP 100A. In the case where the MFP 100 stores the fixed portion in the HDD 115, the fixed portion is acquired by being read out from the HDD 115.

The page display information producing portion 63 receives a set of data, mode specific information, and position information from the data acquiring portion 55. In the case where receiving a set of a fixed portion and screen identification information from the fixed portion acquiring portion 57, the page display information producing portion 63 produces page display information by adding a description to describe an arrangement of data in a mode defined by the mode specific information in a variable region specified by the position information. The page display information producing portion 63 outputs a set of the produced page display information and the screen identification information to the temporary storage portion 77 and outputs the page display information to the screen switch portion 65 and a second operation specifying portion 83 of the operation receiving portion 69. For example, in the case where the mode specific information is scroll display and the data is job identification information, the page display information producing portion 63 adds a description to describe an arrangement of a list of job identification information that can be displayed in a scroll screen in a variable region to the fixed portion. Further, in the case where the mode specific information is pop-up display and the data is a history of jobs, the page display information producing portion 63 adds a description to describe an arrangement of the history of the jobs that can be displayed in a pop-up screen in a variable region to the fixed portion. Further, in the case where the mode specific information is video display and the data is video image data, the page display information producing portion 63 adds a description to describe a playback of the video image data and a description to describe an arrangement of the playback image in a variation region to the fixed portion.

In the case where receiving a set of page display information and screen identification information, the temporary storage portion 77 temporarily stores each of the page display information and the screen identification information, and date and time of the production of the page display information in association with each other in the RAM 114. In the case where receiving a set of data, mode specific information and position information from the data acquiring portion 55 and a set of a fixed portion and screen identification information from the fixed portion acquiring portion 57, if page identification information is associated with the screen identification information and the page identification information produced within a predetermined time period in the past from the current day and time is stored in the RAM 114, the page display information producing portion 63 reads out the page identification information stored in the RAM 114 without producing new page identification information and outputs the read page display information to the screen switch portion 65 and the second operation specifying portion 83 of the operation receiving portion 69.

The ability determining portion 73 determines ability of the device that is connected to the MFP 100 and functions as a remote operation device of the portable information devices 200, 200A, 200B and outputs a result of determination to the screen switch portion 65. Specifically, the ability determining portion 73 determines whether the device has ability to display an operation screen based on the page display information. Here, the page display information is data described in the data description language, so that the ability determining portion 73 determines whether the device can execute a program capable of interpreting the data description language. The program capable of interpreting the data description language is a browsing program, for example. In the case where the portable information device 200 is connected to the MFP 100 and functions as the remote operation device, the ability determining portion 73 determines whether the browsing program is installed in the portable information device 200.

In the case where a result of determination input from the ability determining portion 73 indicates that a device functioning as the remote operation device has the ability to display the operation screen based on the page display information, the screen switch portion 65 outputs the page display information input from the page display information producing portion 63 to a second transmitting portion 87 included in the screen information transmitting portion 67 and outputs a transmit instruction to the switch instructing portion 75. In the case where a result of determination input from the ability determining portion 73 indicates that a device functioning as the remote operation device does not have the ability to display the operation screen based on the page display information, the screen switch portion 65 outputs an image of an operation screen input from the operation screen producing portion 61 to a first transmitting portion 85 included in the screen information transmitting portion 67.

In response to input of the transmit instruction from the screen switch portion 65, the switch instructing portion 75 transmits the switch instruction to a device of the portable information devices 200, 200A, 200B that is connected to the MFP 100 and functions as the remote operation device via the communication I/F unit 112.

The screen information transmitting portion 67 transmits any one of an image of an operation screen and the page display information to the device of the portable information devices 200, 200A, 200B that is connected to the MFP 100 and functions as the remote operation device via the communication I/F unit 112. The device of the portable information devices 200, 200A, 200B that is connected to the MFP 100 and functions as the remote operation device is referred to as a remote operation device. The screen information transmitting portion 67 includes the first transmitting portion 85 and the second transmitting portion 87. In response to input of the image of the operation screen from the screen switch portion 65, the first transmitting portion 85 transmits the operation screen to the remote operation device via the communication I/F unit 112. In response to input of the page display information from the screen switch portion 65, the second transmitting portion 87 transmits the page display information to the remote operation device via the communication I/F unit 112.

Details of functions of the remote operation device will be described below. However, in the case where receiving an image of an operation screen from the MFP 100, if the image of the operation screen is displayed in the display unit 206 and the user designates a position in the image of the operation screen, the remote operation device returns first operation information including position information that indicates the position in the image of the operation screen. In the case where receiving page display information from the MFP 100, the remote operation device executes the browsing program, interprets the page display information and produces an image of an operation screen, and displays the image of the operation screen in the display unit 206. If the user designates a position in the image of the operation screen, the remote operation device returns second operation information including a command, which a task executing the browsing program outputs.

The operation receiving portion 69 controls the communication I/F unit 112 to receive the first operation information or the second operation information returned from the remote operation device after the screen information transmitting portion 67 transmits the image of the operation screen or the page display information.

The first operation specifying portion 81 receives an image of an operation screen from the operation screen producing portion 61. In the case where receiving the first operation information from the remote operation device, the first operation specifying portion 81 specifies a position in the image of the operation screen based on the position information included in the first operation information and specifies an operation assigned to the position specified in the operation screen. The first operation specifying portion 81 outputs operation identification information for identifying the specified operation to the process executing portion

71. For example, if the operation screen includes a button assigned to an operation of making transition to another operation screen, and the position in the operation screen specified by the position information received from the remote operation device is inside of the button, the operation of making transition to another operation screen is specified.

The second operation specifying portion 83 receives page display information from the page display information producing portion 63. In the case where the communication I/F unit 112 receives the second operation information returned from the remote operation device, the second operation specifying portion 83 specifies an operation based on the page display information and a command included in the second operation information and outputs operation identification information for identifying a specified operation to the process executing portion 71. For example, a correspondence table that defines an operation corresponding to a command defined by the page display information may be prepared with respect to the page display information.

In response to input of the operation identification information from any of the first operation specifying portion 81 and the second operation specifying portion 83, the process executing portion 71 executes a process corresponding to an operation identified by the operation identification information. In particular, in the case where the specified operation is an operation of making transition to another operation screen, the process executing portion 71 outputs screen identification information of the other operation screen to the screen determining portion 51. In response to input of the screen identification information from the process executing portion 71, the screen determining portion 51 outputs the screen identification information to the operation screen information acquiring portion 53, the data acquiring portion 55 and the fixed portion acquiring portion 57.

In the case where it is determined by the ability determining portion 73 that a device functioning as a remote operation device does not have the ability to display an operation screen based on page display information, even if the operation screen has a variable region, an image of the operation screen is transmitted to the remote operation device by the first transmitting portion 85, and the first operation specifying portion 81 receives first operation information. An operation specified by a position in the operation screen specified by position information included in the first operation information is sometimes an operation of changing a display mode of the variable region such as a case in which the operation screen includes contents displayed in the variable region in a display mode that enables scroll display, or a case in which the operation specified by the position in the operation screen specified by the position information included in the first operation information is a scroll operation. In this case, the first operation specifying portion 81 allows the operation screen producing portion 61 to produce an image of an operation screen in which the display mode of the variable region is changed. In this case, the image of the operation screen that is produced by the operation screen producing portion 61 and in which the display mode of the variable region is changed is transmitted to the remote operation device by the first transmitting portion 85.

Figure 7:
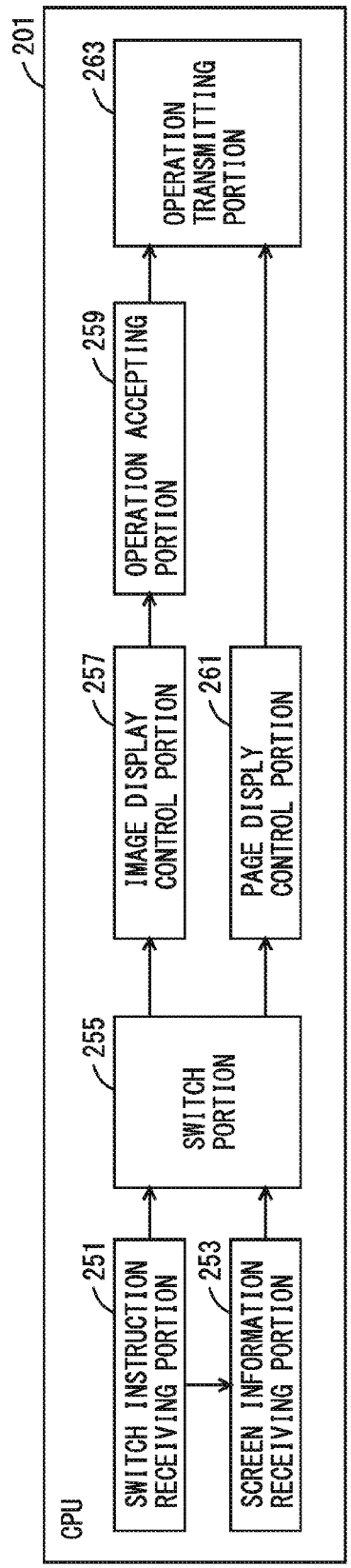
FIG. 7 is a block diagram showing one example of an outline of functions of a CPU included in the portable information device.

FIG. 7 is a block diagram showing an example of an outline of functions of the CPU included in the portable information device. The functions shown in FIG. 7 are formed in the CPU 201 by execution of a remote control program stored in the flash memory 203 or the CD-ROM 211A by the CPU 201 included in the portable information device 200. The remote operation program includes the browsing program. For example, the browsing program is plugged into the remote operation program. Referring to FIG. 7, the CPU 201 includes a switch instruction receiving portion 251, a screen information receiving portion 253, a switch portion 255, an image display control portion 257, an operation accepting portion 259, a page display control portion 261, and an operation transmitting portion 263.

The screen information receiving portion 253 receives an image of an operation screen or page display information from a remote control apparatus of the MFPs 100, 100A, 100B that is a target of a remote operation. A case in which the MFP 100 is the remote control apparatus will be described. Specifically, if the user operates the operation unit 207 and inputs an instruction to remotely control the MFP 100, the screen information receiving portion 253 controls the wireless LAN I/F 208 to transmit a connection request to the MFP 100 and establishes a communication path with the MFP 100. When the wireless LAN I/F 208 receives the image of the operation screen or the page display information from the MFP 100, the screen information receiving portion 253 outputs the image of the operation screen or the page display information to the switch portion 255.

In the case where receiving a switch instruction from the MFP 100, the switch instruction receiving portion 251 outputs the switch instruction to the switch portion 255. The switch instruction is an instruction transmitted before the MFP 100 transmits the page display information. In the case where the switch instruction receiving portion 251 does not receive the switch instruction, the screen information receiving portion 253 receives the image of the operation screen from the MFP 100 and outputs the image of the operation screen to the switch portion 255.

In the case where receiving the image of the operation screen from the screen information receiving portion 253, the switch instruction is not input from the switch receiving portion 251, so that the switch portion 255 outputs the image of the operation screen to the image display control portion 257. In the case where receiving the page display information from the screen information receiving portion 253, the switch instruction is input from the switch instruction receiving portion 251, so that the switch portion 255 outputs the page display information to the page display control portion 261.

The image display control portion 257 controls the display unit 206, displays an image of an operation screen in the display unit 206, and outputs the image of the operation screen to the operation accepting portion 259. In the case where detecting a position designated by the user in the image of the operation screen displayed in the display unit 206, the operation accepting portion 259 determines first operation information including position information indicating a position detected in the image of the operation screen and outputs the determined first operation information to the operation transmitting portion 263.

The page display control portion 261 interprets page display information, produces an image of an operation screen, controls the display unit 206, and displays the produced image of the operation screen in the display unit 206. The page display information is data described in the data description language, so that the image of the operation screen is produced by arrangement of contents defined in the data description language in a format defined by the data description language. For example, the format defines a position at which the contents are arranged and a size of the contents. Further, in the case where the contents are character information, the format defines a size, a font, and color of the character. For example, in the case where the page display information is described in the HTML, an image of an operation screen is produced by arrangement of contents defined by the HTML using a format defined by the HTML. More specifically, in the case where the page display information includes a description of a variable region, the page display control portion 261 produces an image of an operation screen in which an image of contents is arranged in a variable region and displays the image of the operation screen in the display unit 206. In the case where accepting an operation of changing display of contents arranged in a variable region, the page display control portion 261 produces an image of an operation screen after display of contents arranged in the variable region is changed and displays the image of the operation screen in the display unit 206. For example, in the case where the page display information includes a description to describe an arrangement of a list of job identification information that can be scrolled in a variable region as a description of the variable region, the page display control portion 261 produces an image of an operation screen in which part of the list of the job identification information is arranged in the variable region and displays the image of the operation screen in the display unit 206. In the case where accepting an operation of designating a scroll, the page display control portion 261 produces an image of an operation screen in which another part of the list of the job identification information is arranged in the variable region and displays the image of the operation screen in the display unit 206. Further, in the case where the page display information includes a description to describe an arrangement of a history of jobs that can be displayed in a pop-up screen in a variable region as a description of the variable region, the page display control portion 261 produces an image of an operation screen in which a pop-up screen including the history of the jobs is not arranged in the variable region and displays the image of the operation screen in the display unit 206. In the case where the page display control portion 261 accepts an operation of designating the display of a pop-up screen, the page display control portion 261 produces an operation screen in which an image of a pop-up screen including a history of jobs is superimposed in a variable region in an image of an operation screen and displays the operation screen in the display unit 206. Further, in the case where the page display information includes a description to describe a playback of video image data and a description to describe an arrangement of a playback image in a variable region as descriptions of the variable region, the page display control portion 261 produces an image of an operation screen in which a playback image of the video image data is arranged in the variable region and displays the image of the operation screen in the display unit 206.

The page display control portion 261 is a task in which the CPU 201 executes the browsing program. In the case where the user designates any position in an image of an operation screen in accordance with an operation screen displayed in the display unit 206, the page display control portion 261 detects an operation assigned by page display information with respect to an object displayed at the designated position in the operation screen. In response to detection of an operation, the page display control portion 261 outputs a command defined by the page display information with respect to the operation to the operation transmitting portion 263.

For example, commands output by the page display control portion 261 include a command that gives an instruction to make transition of a screen, a command that gives an instruction to execute a process, and a command that gives an instruction to end a process. For example, in the case where a transition button for making transition to another operation screen is included in the page display information as an object, the transition button is included in an image of an operation screen. In the case where the transition button is designated, the page display control portion 261 outputs a command that gives an instruction to make transition of a screen. Further, in the case where an execution button for giving an instruction to execute a process is included in the page display information as an object, the execution button is included in an image of an operation screen. In the case where the execution button is designated, the page display control portion 261 outputs a command that gives an instruction to execute a process. In the case where job identification information or a history of jobs is selected as a target of the process before the execution button is designated, the page display control portion 261 outputs a command that gives an instruction to execute a process of which the target is the selected job identification information or history of the jobs. Further, in the case where an end button for ending a process is included in the page display information as an object, the end button is included in the image of an operation screen. In the case where the end button is designated, the page display control portion 261 outputs a command that gives an instruction to end a process.

In the case where accepting an operation of changing the display of contents arranged in a variable region, the page display control portion 261 produces an image of an operation screen after the display of the contents arranged in the variable region is changed and displays the image of the operation screen in the display unit 206 without outputting a command. Further, in the case where accepting an operation of designating part of the contents arranged in the variable region, the page display control portion 261 selects the designated part in the contents without outputting a command.

For example, in the case where page display information includes a description to describe an arrangement of a list of job identification information that can be displayed in a scroll screen in a variable region as a description of the variable region, the page display control portion 261 produces an image of an operation screen after a portion of the list of the job identification information arranged in a variable region is changed and displays the image of the operation screen in the display unit 206 without outputting a command in the case where accepting an operation of designating a scroll. Further, in the case where the job identification information included in the image of the operation screen is designated, the page display control portion 261 selects the job identification information as a target of a process without outputting a command. Further, in the case where page display information includes a description to describe an arrangement of a history of jobs that can be displayed in a pop-up screen in a variable region as a description of the variable region, the page display control portion 261 produces an operation screen in which images of the pop-up screen including the history of the jobs are superimposed in the variable region in the image of the operation screen and displays the image of the operation screen without outputting a command in the case where accepting an operation of designating the display of a pop-up screen. Further, in the case where the history of the jobs included in the pop-up screen in the image of the operation screen is designated, the page display control portion 261 selects the designated history of the jobs as a target of a process without outputting a command.

The operation transmitting portion 263 receives first operation information from the operation accepting portion 259 and a command from the page display control portion 261. In the case where receiving the first operation information from the operation accepting portion 259, the operation transmitting portion 263 controls the wireless LAN I/F 208 to transmit the first operation information to the MFP 100, which is a remote control apparatus. In the case where receiving a command from the page display control portion 261, the operation transmitting portion 263 controls the wireless LAN I/F 208 to transmit second operation information including a command to the MFP 100, which is a remote control apparatus.

FIG. 8 is a diagram showing one example of an image of an operation screen including a variable region. Referring to FIG. 8, an image 500 of the operation screen includes a variable region 505. The variable region 505 is a region that displays an image of contents in a display mode that enables scroll display. A scroll operation input region 507 is arranged adjacent to the right side of the variable region 505. The scroll operation input region 507 is a region that accepts an operation of allowing the user to scroll the image of the contents displayed in the variable region 505.

FIG. 9 is a diagram showing one example of an image of the contents. Referring to FIG. 9, an image 510 of the contents is an image in which 10 job identification information are arranged. An upper portion 511 of the image 510 of the contents shown in FIG. 9 is arranged in the variable region 505 shown in FIG. 8. A dotted line in FIG. 9 is provided to show the upper portion 511 of the image 510 of the contents and does not actually exist. In the case where the user designates the scroll operation input region 507 of the image 500 of the operation screen shown in FIG. 8, a portion other than the upper portion 511 of the image 510 of the contents shown in FIG. 9 is displayed in the variable region 505 of the image 500 of the operation screen.

Figure 10:
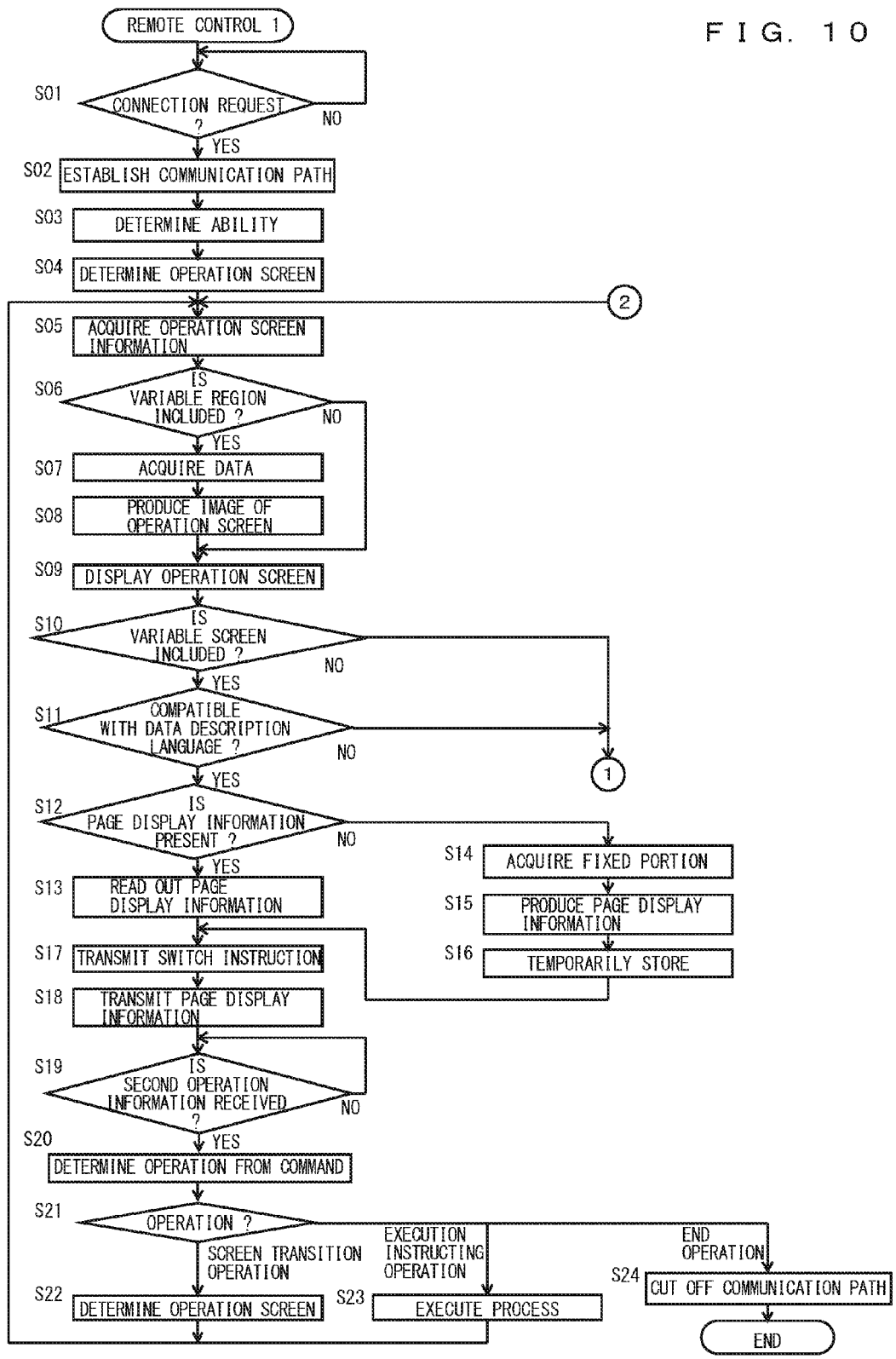
FIG. 10 is a first flow chart showing one example of a flow of a remote control process.
Figure 11:
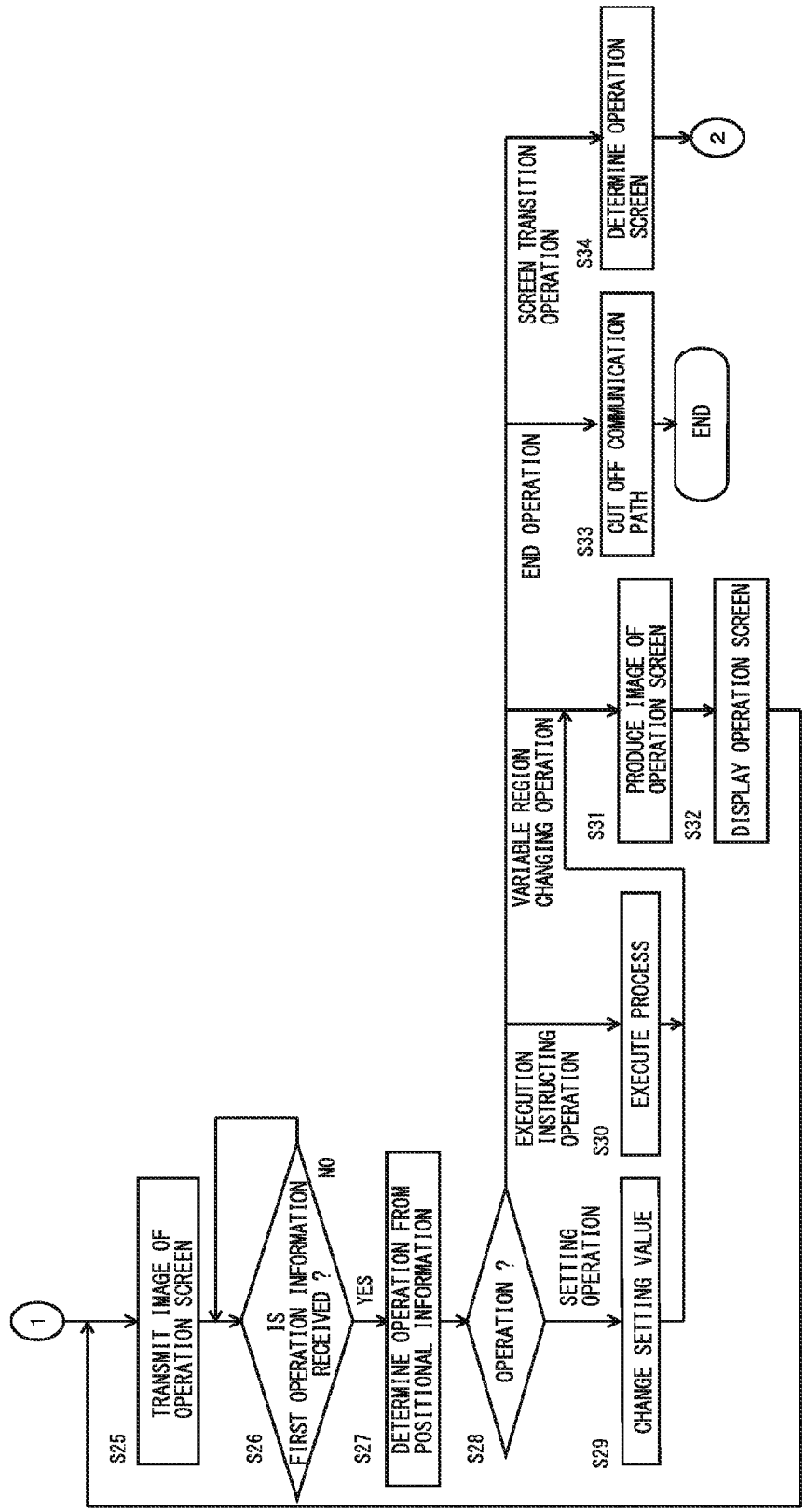
FIG. 11 is a second flow chart showing one example of the flow of the remote control process.

FIGS. 10 and 11 are flow charts showing one example of a flow of the remote control process. The remote control process is a process executed by the CPU 111 when the CPU 111 included in the MFP 100 executes a remote control program stored in the ROM 113, the HDD 115, the CD-ROM 118. Referring to FIGS. 10 and 11, the CPU 111 determines whether a connection request has been received (step S01). It is determined whether the communication I/F unit 112 has received the connection request from a remote operation device. The process waits until the connection request is received. If the connection request has been received, the process proceeds to the step S02. A case in which the connection request has been received from the user portable information device 200, which is the remote operation device, is described, by way of example.

In the step S02, a communication path is established with the portable information device 200. Ability of the portable information device 200 is determined (step S03). Specifically, it is determined whether the portable information device 200 is compatible with page display information described in the data description language. For example, in the case where the browsing program is installed in the portable information device 200, it is determined that the portable information device 200 is compatible with the page display information.

In the next step S04, an operation screen to be a target of a process is determined. In the case where the process proceeds from the step S03, it is immediately after the connection is established with the portable information device 200, which is the remote operation device. In this case, an operation screen to be transmitted first is defined as a default and is determined as the operation screen to be the target of the process.

In the next step S05, operation screen information corresponding to the operation screen is acquired. The operation screen is determined in the step S04, or the step S22 or the step S034, described below, before the process proceeds to the step S05. In the step S05, the operation screen information corresponding to the operation screen determined before the step S05 is performed is acquired. The operation screen information includes an image of the operation screen. In the case where the operation screen includes contents of which a display mode is capable of changing in a variable region, the operation screen information further includes position information indicating a position of the variable region in the operation screen and display control information indicating a method of displaying the contents.

In the next step S06, it is determined whether the operation screen determined as the target of the process includes a variable region based on the operation screen information acquired in the step S05. If the operation screen includes the variable region, the process proceeds to the step S07. If not, the process proceeds to the step S09.

In the step S07, data is acquired based on display control information included in the operation screen information acquired in the step S05. The display control information includes data specific information that specifies data included in the contents and mode specific information that specifies a mode in which data is displayed. In the case where the data is fixed, data specific information includes data identification information for identifying the data. In the case where the data is not fixed, the data specific information includes information for producing the data. Specifically, if the data specific information is the data identification information, the CPU 111 acquires data specified by the data identification information. For example, if the data identification information is video image data, the CPU 111 acquires the video image data. If this video image data is stored in the HDD 115, the video image data is read out from the HDD 115. Further, if the video image data is stored in a computer connected to the internet, the video image data is downloaded from the computer. If the data specific information is a condition for producing the data, the CPU 111 acquires the data in accordance with the condition. For example, in the case where the data included in the contents is a list of jobs associated with the user, the information for producing the data includes jobs accumulated in the MFPs 100, 100A, 100B as targets of search and user identification information for identifying the user as a search key, as a condition for producing the data. The user identification information is information for identifying the user who operates the portable information device 200, which is the remote operation device. The CPU 111 acquires job identification information of the job associated with the user identification information that is the search key of the jobs accumulated in each of the MFPs 100, 100A, 100B and acquires the job identification information of the acquired job as the data of the contents. Further, in the case where the data included in the contents is a history of jobs executed by the MFP 100, the information for producing the data includes a name of a folder that stores the history of the jobs as the condition for producing the data. The history of the jobs stored in the folder specified by the name of the folder is acquired as the data of the contents.

In the step S08, an image of an operation screen is produced. Specifically, the image of the operation screen is produced in accordance with the data acquired in the step S07 and the display control information included in the operation screen information acquired in the step S05. In the case where the process proceeds to the step S08, the operation screen information acquired in the step S05 includes an image of an operation screen, position information indicating a position of a variable region in the image of the operation screen and display control information. The display control information includes data specific information and mode specific information that specifies a mode in which the data is displayed. The CPU 111 produces an image of an operation screen by arranging the data acquired in the step S07 in the mode defined by the mode specific information in the variable region specified by the position information included in the operation screen information in the image of the operation screen included in the operation screen information.

In the next step S09, the image of the operation screen is displayed in the display unit 161, and the process proceeds to the step S10. In the case where the process proceeds from the step S06, the image of the operation screen included in the operation screen information acquired in the step S05 is displayed in the display unit 161. In the case where the process proceeds from the step S08, the image of the operation screen produced in the step S08 is displayed in the display unit 161.

In the step S10, similarly to the step S06, it is determined whether the operation screen includes a variable region based on the operation screen information. If the operation screen includes the variable region, the process proceeds to the step S11. If not, the process proceeds to the step S25.

In the step S11, it is determined whether the portable information device, which is the remote operation device, is compatible with the data description language. The process branches depending on a result of determination in the step S03. If the result of determination indicates compatibility of the portable information device with the data description language, the process proceeds to the step S12. If not, the process proceeds to the step S25.

In the step S12, it is determined whether page display information that corresponds to the operation screen determined as the target of the process in the step S04 and of which an elapsed time period since production is within a predetermined time period is present. If such page display information is present, the process proceeds to the step S13. If not, the process proceeds to the step S14.

In the step S14, a fixed portion is acquired. The fixed portion associated in advance with the operation screen determined as the target of the process in the step S04 is acquired. The fixed portion is described in the data description language such as mark-up language and includes a description to describe a display of a fixed region other than a variable region in an operation screen including a variable region. The fixed portion is common to the MFPs 100, 100A, 100B and is stored in any of the MFPs 100, 100A, 100B. For example, in the case where the MFP 100A stores the fixed portion, the CPU 111 acquires the fixed portion from the MFP 100A. In the case where the MFP 100 stores the fixed portion in the HDD 115, the CPU 111 acquires the fixed portion by reading out the fixed portion from the HDD 115.

In the next step S15, the page display information is produced. An image of an operation screen is produced in accordance with the data acquired in the step S07, the fixed portion acquired in the step S14, the position information and the display control information included in the operation screen information acquired in the step S05. Specifically, the operation screen information includes an image of an operation screen, the position information indicating a position of a variable region in the image of the operation screen and the display control information. The display control information includes the data specific information and the mode specific information in which the data is displayed. The CPU 111 produces the page display information by adding a description to describe an arrangement of the data acquired in the step S07 in a mode defined by mode specific information in the variable region specified by the position information to the fixed portion.

Then, the produced page display information is temporarily stored in the RAM 114, and the process proceeds to the step S17. In this process, the page display information is stored in association with the current date and time. This is for the purpose of associating the date and time of the production of the page display information with the page display information.

In the step S17, a switch instruction is transmitted to the portable information device 200, which is the remote operation device. This is for the purpose of allowing the portable information device 200 to activate the browsing program. In the next step S18, the page display information read out in the step S13 or the page display information produced in the step S15 is transmitted to the portable information device 200, which is the remote operation device, and the process proceeds to the step S19.

In the step S19, the process waits until second operation information is received from the portable information device 200, which is the remote operation device (NO in the step S19). If the second operation information has been received (YES in the step S19), the process proceeds to the step S20. The second operation information includes a command. In the step S20, an operation is determined based on a command included in the second operation information. A correspondence table that defines an operation corresponding to a command defined by the page display information is prepared in advance with respect to the page display information transmitted in the step S18. An operation corresponding to the command included in the second operation information is determined with reference to the correspondence table.

In the next step S21, the process branches depending on the determined operation. If the operation is a screen transition operation, the process proceeds to the step S22. If the operation is an execution instructing operation, the process proceeds to the step S23. If the operation is an end operation, the process proceeds to the step S24. In the step S22, an operation screen specified by the screen transition operation is determined as a target of a process, and the process returns to the step S05. In the step S23, a process is executed in accordance with the execution instructing operation, and the process returns to the step S05. In the step S24, the communication path established in the step S02 is cut off, and the process ends.

The process proceeds to the step S25 in the case where the operation screen determined as the target of the process does not include a variable region, or in the case where the operation screen determined as the target of the process includes a variable region and the portable information device 200, which is the remote control apparatus, is not compatible with the data description language. In the step S25, in the case where the step S08 is performed, the image of the operation screen produced in the S08 is transmitted to the remote operation device and the process proceeds to the step S26. In the case where the step S08 is not preformed, the image of the operation included in the operation screen information acquired in the step S05 is transmitted to the remote operation device, and the process proceeds to the step S26. In the step S26, the process waits until first operation information is received from the portable information device 200, which is the remote operation device (NO in the step S26). If the first operation information has been received (YES in the step S26), the process proceeds to the step S27. The first operation information includes position information. In the step S27, an operation is determined based on the position information included in the first operation information. Specifically, an operation corresponding to a position specified by the position information in the image of the operation screen transmitted in the step S25 is determined.

In the next step S28, the process branches depending on the determined operation. If the operation is a setting operation of setting a setting value, the process proceeds to the step S29. If the operation is a execution instructing operation, the process proceeds to the step S30. If the operation is a variable region changing operation of changing a variable region, the process proceeds to the step S31. If the operation is an end operation, the process proceeds to the step S33. If the operation is a screen transition operation, the process proceeds to the step S34.

In the step S29, a setting value defined by the setting operation is set, and the process proceeds to the step S31. In the step S30, the process is executed in accordance with the execution instructing operation, and the process proceeds to the step S31. In the step S31, an image of an operation screen is produced, and the process proceeds to the step S32. In the case where the process proceeds from the step S29, an image of an operation screen including an image of the set setting value is produced. In the case where the process proceeds from the step S30, an image of an operation screen including an image of a message indicating that the process is in progress is produced. In the case where the process proceeds from the step S28, an image of an operation screen in which a display mode of the variable region is changed to a display mode defined by the variable region changing operation is produced. For example, in the case where data is displayed in the variable region to be scrollable, the variable region changing operation defines an amount of scroll, so that an image of an operation screen in which the variable region is scrolled by the amount of scroll is produced. Further, in the case where data that can be displayed in a pop-up screen is displayed in the variable region, the variable region changing operation defines presence of a pop-up screen, so that an image of an operation screen after an image of a pop-up screen is added to the variable region is produced.

In the next step S32, the image of the operation screen produced in the step S31 is displayed in the display unit 161, and the process returns to the step S25. In the step S25, in the case where the process proceeds from the step S32, the image of the operation screen produced in the step S31 is transmitted to the remote operation device, and the process proceeds to the step S26. In the step S33, the communication path established in the step S02 is cut off, and the process ends. In the step S34, the operation screen specified by the screen transition operation is determined as a target of a process, and the process returns to the step S05.

Figure 12:
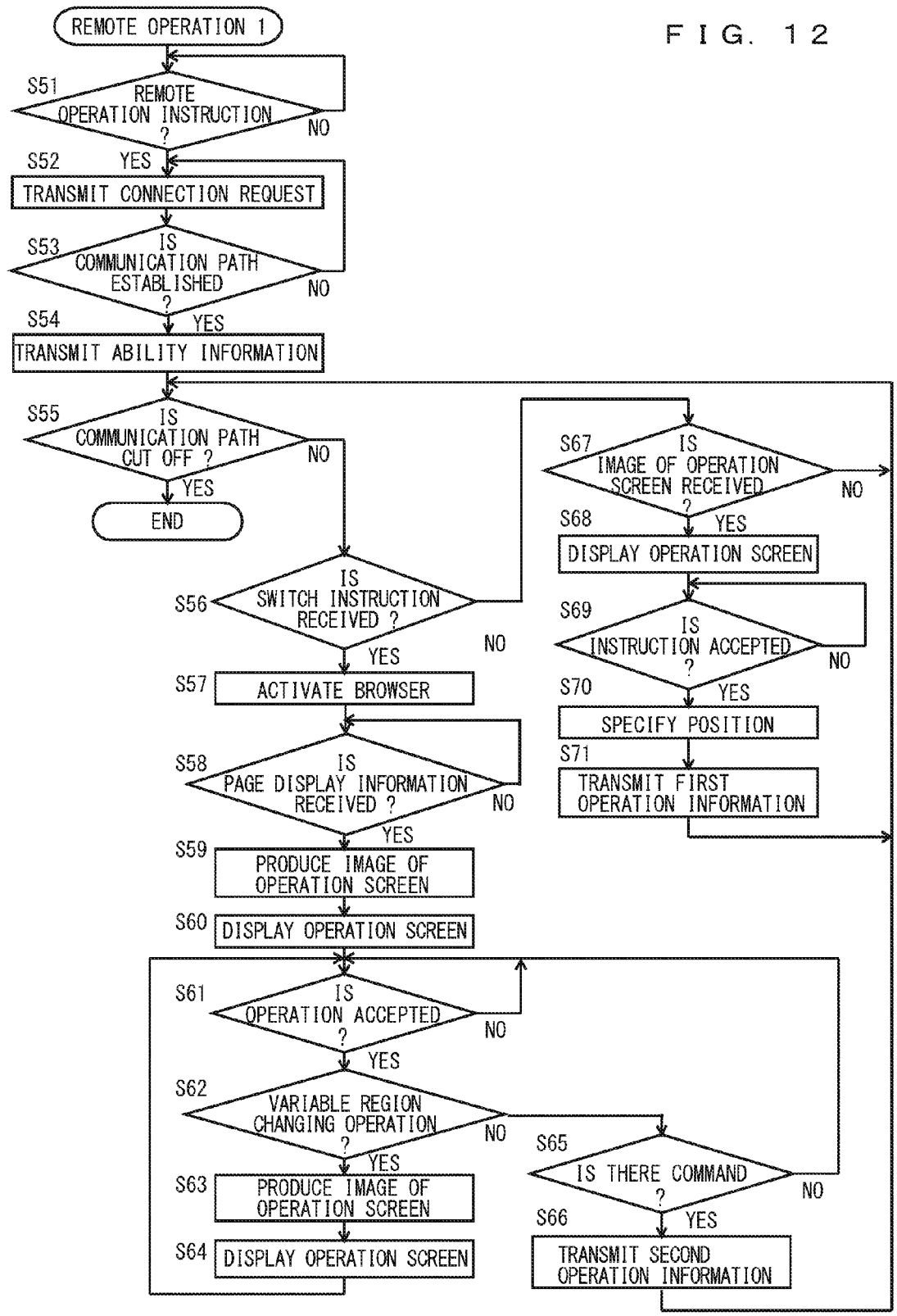
FIG. 12 is a flowchart showing one example of the flow of the remote operation process.

FIG. 12 is a flow chart showing one example of a flow of the remote operation process. The remote operation process is a process executed when the CPU 201 included in each of the portable information devices 200, 200A, 200B executes a remote operation program stored in the flash memory 203 or the CD-ROM 211A. The remote operation program includes the browsing program. A case in which the remote information device 200 executes the remote operation process is described, by way of example.

Referring to FIG. 12, the CPU 201 determines whether a remote operation instruction has been accepted (step S51). If the operation unit 207 has accepted the remote operation instruction input by the user, the CPU 201 accepts the remote operation instruction. The process waits until the remote operation instruction has been accepted (NO in step S51). If the remote operation instruction has been accepted (YES in step S51), the process proceeds to the step S52. The remote operation instruction includes an instruction that specifies a remote control apparatus that is a target of the remote operation. A case in which the MFP 100 is specified as the remote control apparatus is described, by way of example.

In the step S52, a connection request is transmitted to the MFP 100, which is the remote control apparatus. The connection request is transmitted in order to control the wireless LAN I/F 208 to establish a communication path with the MFP 100. Then, it is determined whether the communication path has been established (step S53). The communication path is established by negotiation with the MFP 100. The step S52 is repeated until the communication path is established (NO in the step S53). If the communication path has been established (YES in the step S53), the process proceeds to the step S54.

In the step S54, ability information is transmitted to the MFP 100. The ability information is information that indicates whether the browsing program is installed in a portable information device. In the next step S55, it is determined whether the communication path established in the step S53 has been cut off. If the communication path has been cut off, the process ends. If not, the process proceeds to the step S56. In the step S56, it is determined whether a switch instruction has been received from the MFP 100. If the switch instruction has been received, the process proceeds to the step S57. If not, the process proceeds to the step S67.

In the step S57, a browser is activated. In other words, the browsing program is executed. Then, the process waits until page display information is received (NO in step S58). If the page display information has been received (YES in step S58), the process proceeds to the step S59. In the step S59, the page display information is interpreted and an image of an operation screen is produced. In the next step S60, the image of the operation screen is displayed in the display unit 206, and the process proceeds to the step S61.

In the step S61, it is determined whether an operation by the user has been accepted. The process waits until the operation is accepted (NO in step S61). If the operation has been accepted (YES in the step S61), the process proceeds to the step S62. In the case where the touch panel 207 detects a position designated by the user, the operation is accepted. An operation assigned by the page display information to an object displayed at a position designated in the operation screen is determined. In the step S62, it is determined whether the detected operation is the variable region changing operation. If the accepted instruction is the variable region changing operation, the process proceeds to the step S63. If not, the process proceeds to the step S65. The variable region changing operation is an operation of designating a scroll in the case where the operation screen specified by the page display information displays contents in a variable region in a display mode that enables scroll display. Further, the variable region changing instruction is an operation of designating the display of a pop-up screen in the case where the operation screen specified by the page display information displays contents in the variable region in a display mode that enables pop-up display.

In the step S63, an image of an operation screen after the display mode of the variable region is changed is produced in accordance with the variable region changing operation. The produced image of the operation screen is displayed in the display unit 206 (step S64), and the process returns to the step S61.

In the step S65, it is determined whether an operation accepted in the step S61 is an operation of designating a command. If a command is assigned by the page display information to an object displayed at a position designated in the operation screen, the operation is determined to be the operation of designating a command. If the operation designates a command, the process proceeds to the step S66. If not, the process returns to the step S61. In the step S66, second operation information including a command is transmitted to the MFP 100, which is the remote control apparatus, and the process returns to the step S55.

On the one hand, in the step S67, it is determined whether an image of an operation screen has been received from the MFP 100. If the image of the operation screen has been received, the process proceeds to the step S68. If not, the process returns to the step S55. In the step S68, the image of the operation screen received in the step S67 is displayed in the display unit 206, and the process proceeds to the step S69.

In the step S69, it is determined whether an instruction given by the user has been accepted. The process waits until the instruction is accepted (NO in the step S69). If the instruction has been accepted (YES in the step S69), the process proceeds to the step S70. In the case where the touch panel 207 detects a position designated by the user, the instruction is accepted.

In the step S70, a position in the image of the operation screen is specified based on the position designated by the user and detected in the step S69. Then, first operation information that includes position information indicating a specified position is transmitted to the MFP 100, which is the remote control apparatus (step S71), and the process returns to the step S55.

Modified Example

In the print system 1 in the foregoing embodiment, the MFP 100 that functions as the remote control apparatus stores the correspondence table in which a command is associated with an operation and specifies an operation input in the portable information device 200 based on the page display information and the command included in the second operation information received from the remote operation device. In a print system in the modified example, the MFP 100 that functions as a remote control apparatus does not store a correspondence table in which a command is associated with an operation. Differences from the print system 1 in the foregoing embodiment will be mainly described, and the same description is not repeated.

Figure 13:
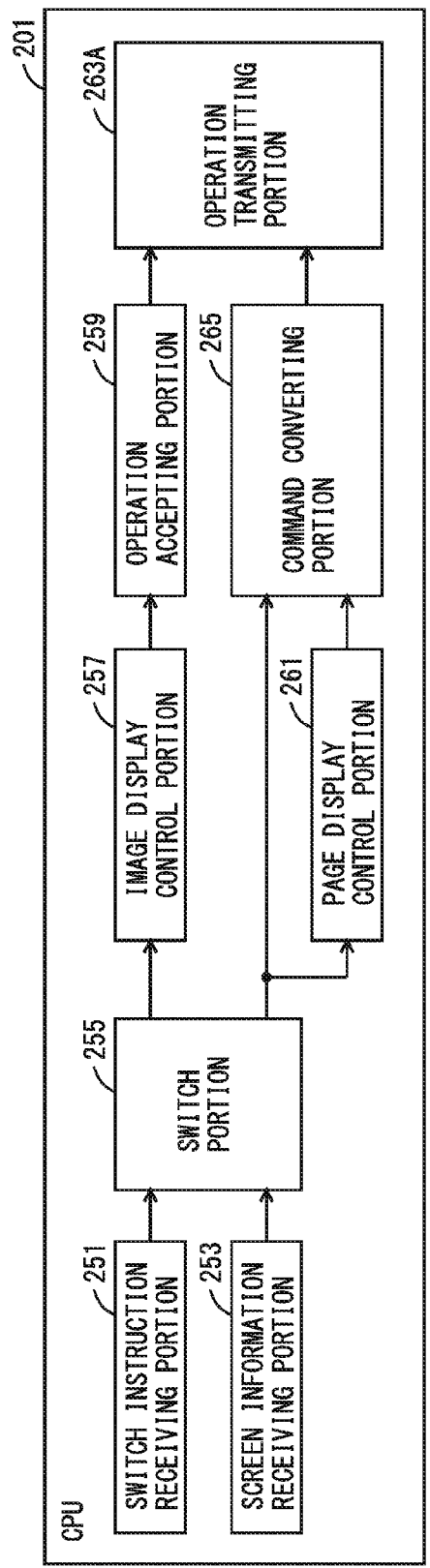
FIG. 13 is a block diagram showing one example of an outline of functions of a CPU included in the portable information device in a modified example of the present embodiment.

FIG. 13 is a block diagram showing one example of an outline of functions of a CPU included in a portable information device in the modified example of the present embodiment. Referring to FIG. 13, differences from the functions shown in FIG. 7 lie in that a command converting portion 265 is added and that the operation transmitting portion 263 is changed to an operation transmitting portion 263A. The other functions are the same as the functions shown in FIG. 7. A description thereof is therefore not be repeated.

The command converting portion 265 receives page display information from the switch portion 255 and an image of an operation screen and a command from the page display control portion 261. The command converting portion 265 determines second operation information including a set of variable information indicating a state in which a display mode of a variable region in the operation screen is changed, and position information indicating a position in an image of an operation screen after the display mode of the variable region is changed, based on the page display information and the command. For example, the command converting portion 265 produces an image of an operation screen in which the display mode of the variable region is changed by changing a parameter based on the page display information, determines a parameter at which the produced image of the operation screen matches the image of the operation screen input from the page display control portion 261 immediately before the command is input from the page display control portion 261, and produces variable information based on the determined parameter. Further, the command converting portion 265 specifies a position in the image of the operation screen input from the page display control portion 261 immediately before the command is input from the page display control portion 261 based on the command.

The command converting portion 265 determines the second operation information including the produced variable information and the position information indicating the position specified in the image of the operation screen and outputs the determined second operation information to the operation transmitting portion 263.

For example, in the case where the operation screen includes contents displayed in a variable region in a display mode that enables scroll display, when an amount of scroll is a parameter, images of a plurality of operation screens in a display mode in which the variable regions are scrolled by a plurality of amounts of scroll are produced, whereby the command converting portion 265 determines an amount of scroll that matches the image of the operation screen input from the page display control portion 261 immediately before the command is input from the page display control portion 261 as variable information. Then, the command converting portion 265 specifies a position at which the image of the data specified by the command is included in the image of the operation screen input from the page display control portion 261 immediately before the command is input from the page display control portion 261.

Further, in the case where the operation screen includes contents that can be displayed in a pop-up screen and presence and absence of pop-up display is a parameter, if an image of an operation screen in a display mode in which a pop-up screen is displayed in a variable region matches the image of the operation screen input from the page display control portion 261 immediately before the command is input from the page display control portion 261, the command converting portion 265 determines presence of the pop-up display as the variable information. In the case where the operation screen includes contents that can be displayed in a pop-up screen and presence and absence of pop-up display is a parameter, if an image of an operation screen in a display mode in which a pop-up screen is not displayed in a variable region matches the image of the operation screen input from the page display control portion 261 immediately before the command is input from the page display control portion 261, the command converting portion 265 determines absence of the pop-up display as the variable information. The command converting portion 265 specifies a position at which the image of the data specified by the command is included in the image of the operation screen input from the page display control portion 261 immediately before the command is input from the page display control portion 261.

The command converting portion 265 may produce the variable information from a difference between the image of the operation screen first input from the page display control portion 261 and the image of the operation screen input from the page display control portion 261 immediately before the command is input from the page display control portion 261.

Further, in the case where the position specified in the image of the operation screen is outside of the variable region, the command converting portion 265 may determine first operation information including position information that indicates the position specified in the image of the operation screen and output the determined first operation information to the operation transmitting portion 263. In the case where a position specified in the image of the operation screen is inside of the variable region, the command converting portion 265 may determine second operation information including the produced variable information and position information that indicates the position specified in the image of the operation screen and output the determined second operation information to the operation transmitting portion 263.

The operation transmitting portion 263A receives the first operation information from the operation accepting portion 259 to receive the second operation information or the first operation information from the command converting portion 265. In the case where receiving the first operation information from the operation accepting portion 259, the operation transmitting portion 263A controls the wireless LAN I/F 208 to transmit the first operation information to the MFP 100, which is the remote control apparatus. In the case where receiving the second operation information from the page display control portion 261, the operation transmitting portion 263A controls the wireless LAN I/F 208 to transmit the second operation information to the MFP 100, which is the remote control apparatus.

Figure 14:
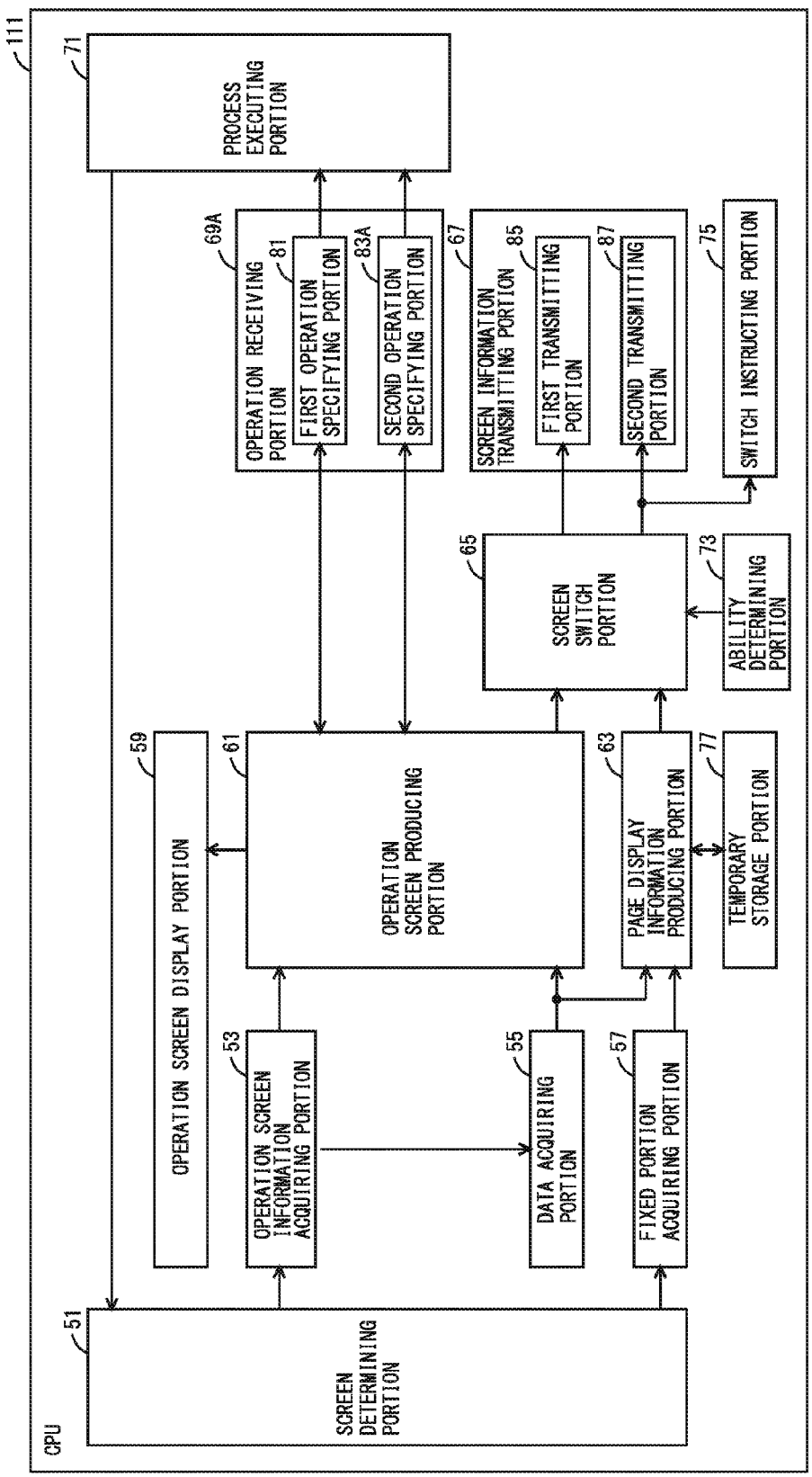
FIG. 14 is a block diagram showing one example of functions of a CPU included in an MFP in the modified example of the present embodiment.

FIG. 14 is a block diagram showing one example of functions of the CPU included in the MFP in the modified example of the present embodiment. Referring to FIG. 14, a difference from the functions shown in FIG. 6 lies in that the operation receiving portion 69 is changed to an operation receiving portion 69A. The other functions are the same as the functions shown in FIG. 6, and a description thereof is therefore not repeated.

Referring to FIG. 14, the operation receiving portion 69A controls the communication I/F unit 112 and receive the first operation information or the second operation information returned from the remote operation device after the screen information transmitting portion 67 transmits an image of an operation screen or page display information. The first operation information includes the position information. The second operation information includes the variable information and the position information.

The operation receiving portion 69A includes the first operation specifying portion 81 and a second operation specifying portion 83A. The first operation specifying portion 81 receives an image of an operation screen from the operation screen producing portion 61. In the case where receiving the first operation information from the remote operation device, the first operation specifying portion 81 specifies a position in the image of the operation screen based on the position information included in the first operation information and specifies an operation assigned to the position specified in the operation screen. The first operation specifying portion 81 outputs operation identification information for identifying the specified operation to the process executing portion 71.

The second operation specifying portion 83A receives an image of an operation screen from the operation screen producing portion 61. In the case where receiving the second operation information from the remote operation device, the second operation specifying portion 83A outputs a production instruction including the variable information included in the second operation information to the operation screen producing portion 61 and allows the operation screen producing portion 61 to produce an image of an operation screen after a display mode of the variable region is changed to the display mode specified by the variable information. For example, in the case where the operation screen includes contents displayed in a variable region in a display mode that enables scroll display, the variable information is an amount of scroll, so that the second operation specifying portion 83A allows the operation screen producing portion 61 to produce an operation screen in a display mode after the variable region is scrolled by an amount of scroll. Further, in the case where an operation screen includes contents that can be displayed in a pop-up screen, variable information indicates the pop-up display, so that the second operation specifying portion 83A allows the operation screen producing portion 61 to produce an operation screen in a pop-up display mode in the variable region. The second operation specifying portion 83A specifies a position in the image of the operation screen that is produced by the operation screen producing portion 61 and after the display mode of the variable region is changed based on the position information included in the second operation information, and specifies an operation assigned to the position specified in the operation screen after the display mode of the variable region is changed. The second operation specifying portion 83A outputs operation identification information for identifying the specified operation to the process executing portion 71.

For example, in the case where the operation screen includes the contents displayed in the variable region in the display mode that enables scroll display, a portion that is not displayed in the variable region in the operation screen before the display mode of the variable region is changed is displayed in the variable region in the operation screen after the display mode of the variable region is changed. In the case where a position specified by the position information is in the variable region, an operation corresponding to the portion that is not displayed in the operation screen before the display mode of the variable region is changed can be specified. Further, in the case where the operation screen includes contents that can be displayed in a pop-up screen, a portion that is not displayed in a pop-up screen in the operation screen before the display mode of the variable region is changed is displayed in a pop-up screen in the operation screen after the display mode of the variable region is changed. Therefore, in the case where a position specified by the position information is in the variable region, an operation corresponding to the portion, displayed in a pop-up screen, which is not displayed in the operation screen before the display mode of the variable region is changed can be specified.

Figure 15:
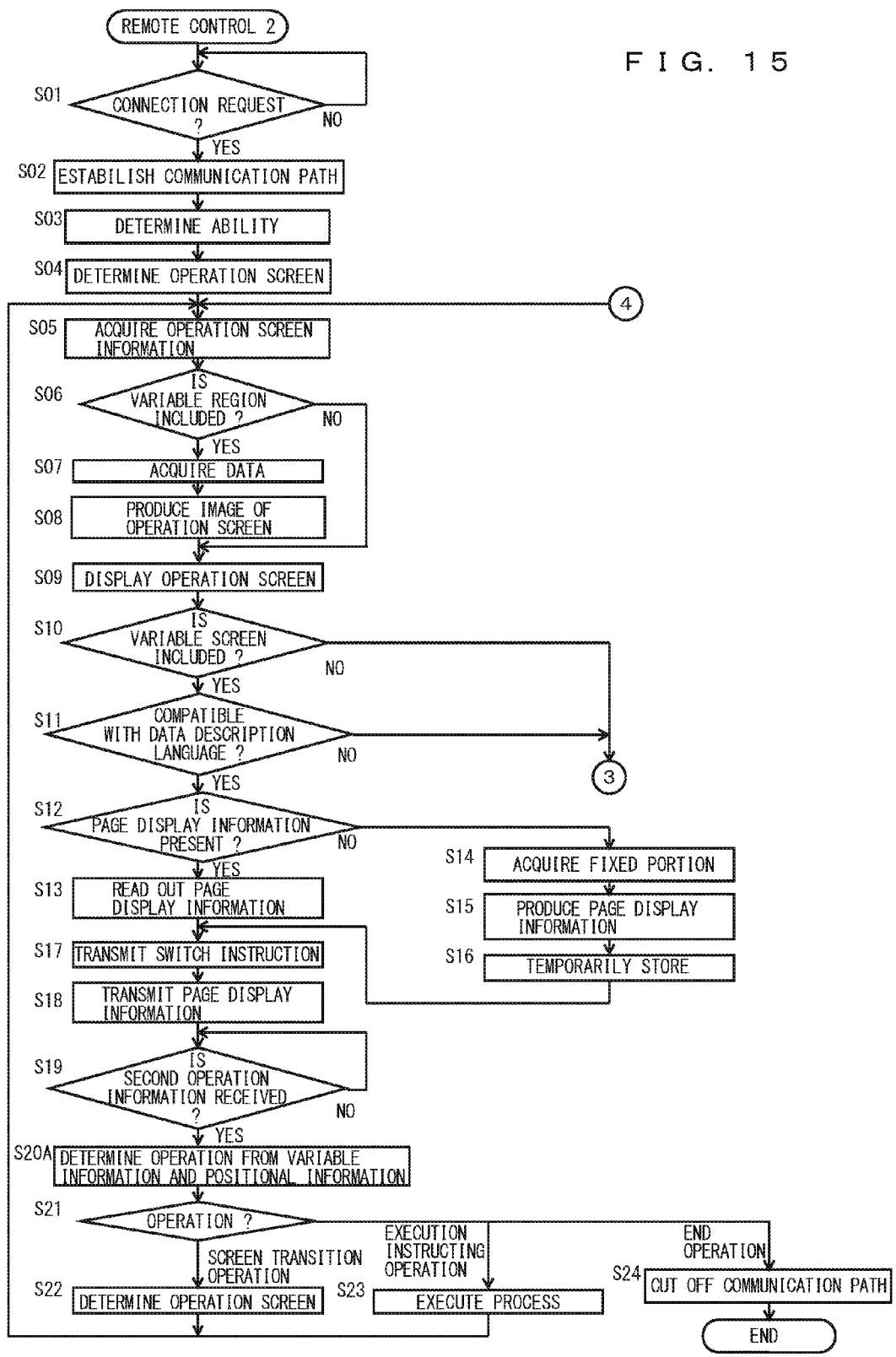
FIG. 15 is a first flow chart showing one example of a flow of a remote control process in a modified example.
Figure 16:
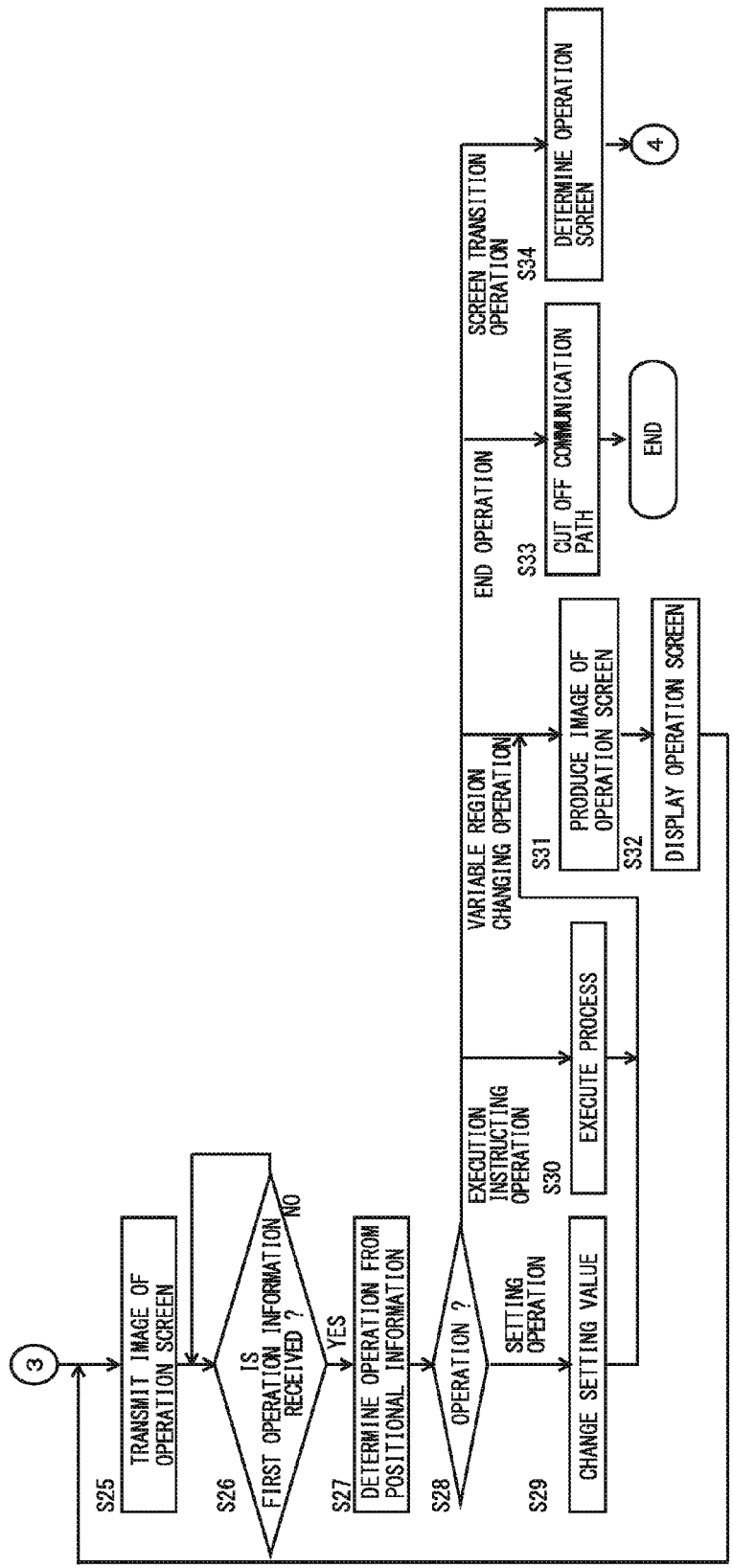
FIG. 16 is a second flow chart showing one example of the flow of the remote control process in the modified example.

FIGS. 15 and 16 are flow charts showing one example of a flow of the remote control process in the modified example. A difference of the remote control process in the modified example from the remote control process shown in FIGS. 10 and 11 lies in that the step S20 is changed to the step S20A. The other processes are the same as the processes shown in FIGS. 10 and 11, and a description thereof is therefore not repeated.

In the step S20A, an operation is determined based on the variable information and the position information included in the second operation information received in the step S19. An image of an operation screen after the display mode of the variable region in the operation screen is changed to a display mode specified by the variable information is produced. Specifically, the data acquired in the step S07 is arranged in the variable region specified by the position information included in the operation screen information with the display mode defined by the variable information in the image of the operation screen included in the operation screen information acquired in the step S05, whereby the image of the operation screen is produced.

Then, a position in the image of the operation screen after the display mode of the variable region is changed is specified based on the position information included in the second operation information, and an operation assigned to a position specified in the operation screen after the display mode of the variable region is changed is specified.

Figure 17:
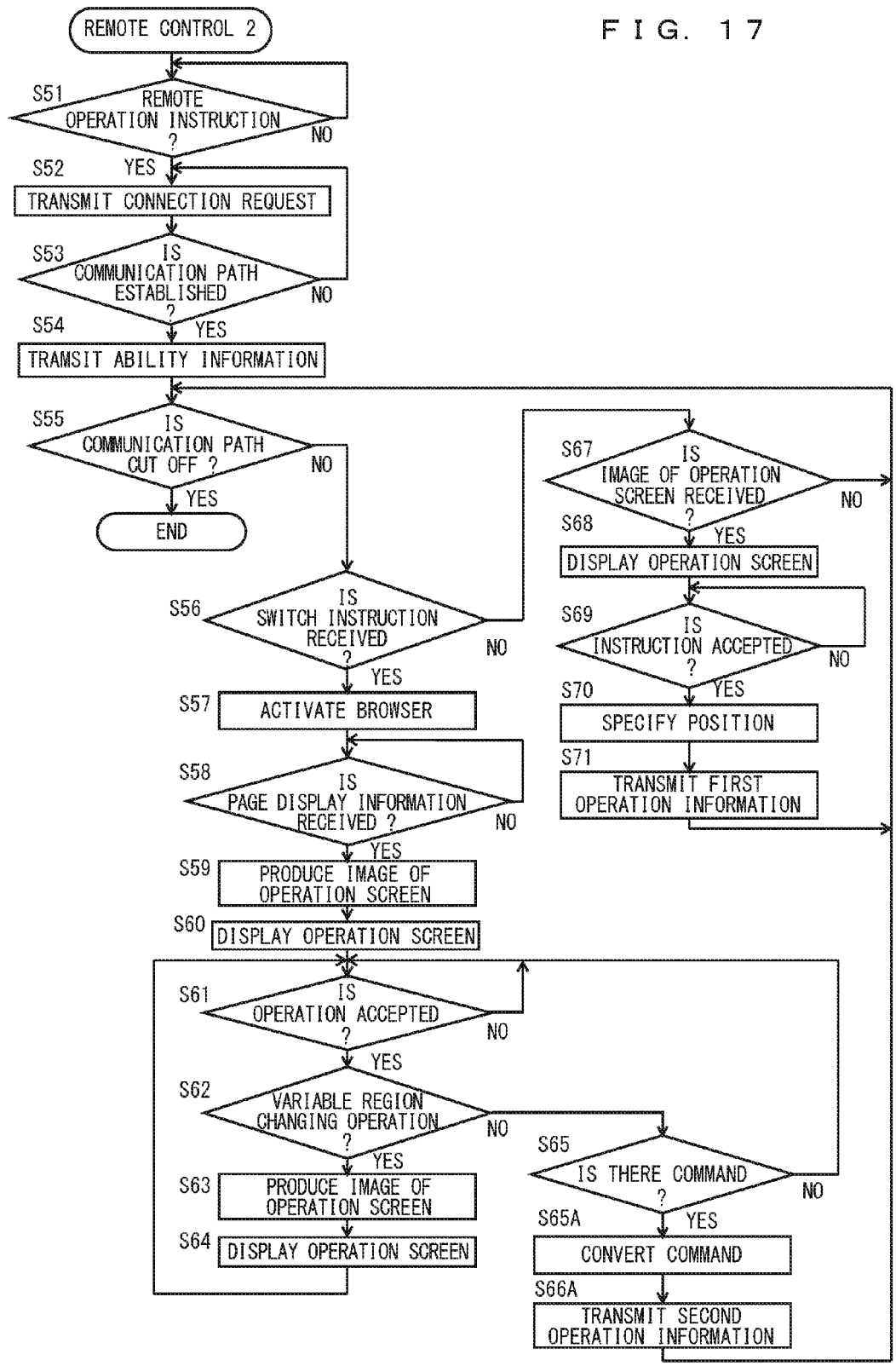
FIG. 17 is a flow chart showing one example of the flow of the remote operation process in the modified example.

FIG. 17 is a flow chart showing one example of a flow of the remote operation process in the modified example. Differences of the remote operation process in the modified example from the remote operation process shown in FIG. 12 lie in that the step S65A is added, and that the step S66 is changed to the step S66A. The other processes are the same as the process shown in FIG. 11, and a description thereof is therefore not repeated.

In the case where the CPU determines in the step S65 that an operation accepted in the step S61 is an operation of designating a command, the process proceeds to the step S65A. In the step S65A, a command determined in the step S65 is converted into variable information and position information. Specifically, the variable information indicating a state in which the display mode of the variable region in the operation screen is changed and the position information indicating a position in the image of the operation screen after the display mode of the variable region is changed are determined based on the page display information received in the step S58 and the command determined in the step S65.

For example, an image of an operation screen in which a display mode of a variable region is changed is produced by changing of a parameter based on page display information, a parameter at which the produced image of the operation screen matches the image of the operation screen finally produced in the step S59 is determined, and variable information is produced based on the determined parameter.

In the next step S66A, the second operation information including the variable information and the position information determined in the step S65A is transmitted to the MFP 100, which is the remote control device, and the process returns to the step S55.

As described above, the MFP 100 in the present embodiment functions as a remote control apparatus that is remotely operated by the portable information device 200, which is a remote operation device. In the case where an operation screen transmitted to the remote information device 200 includes contents in which a display mode is capable of changing in a variable region, the MFP 100 produces page display information. In the case where an operation screen does not include a variable region, the MFP 100 transmits an image of an operation screen to the portable information device 200. In the case where an operation screen includes a variable region, the MFP 100 transmits the page display information to the portable information device 200. Therefore, in the case where an operation screen includes a variable region, a display mode of a variable region can be changed in the portable information device 200 for the display, so that it is not necessary to transmit an image of an operation screen to the portable information device 200 every time the display mode of the variable region changes. An amount of data to be transmitted to the portable information device 200 can be reduced.

Further, in the case where receiving an image of an operation screen, the portable information device 200 transmits first operation information including position information designated by the user in the image of the operation screen to the MFP 100. In the case where receiving page display information, the portable information device 200 transmits second operation information including a command corresponding to an operation input by the user with respect to the image of the operation screen to the MFP 100. In the case where receiving the first operation information, the MFP 100 specifies an operation based on a position defined by the position information included in the first operation information in the image of the operation screen. In the case where receiving the second operation information, the MFP 100 specifies an operation based on the page display information and a command included the second operation information. Therefore, whether transmitting the image of the operation screen or transmitting the page display information, the MFP 100 can specify an operation by the user who operates the portable information device 200.

Further, the MFP 100 acquires a fixed portion including a description to describe a display of a fixed region of an operation screen including a variable region, acquires data included in contents, and produces page display information based on the acquired data and fixed portion. Therefore, the page display information can be easily produced.

Further, the MFP 100 acquires a fixed portion from a recording medium common to the other MFPs 100A, 100B, so that the fixed portion can be managed in one location.

Further, the MFP 100 acquires data from the other MFPs 100A, 100B, so that a remote operation screen including the data recorded in the other MFPs 100A, 100B can be displayed in the portable information device 200.

Further, the MFP 100 transmits a switch instruction before transmitting page display information, so that it is not necessary to determine data received by the portable information device 200, and a process of a portable information device can be simplified.

Further, in the case where the portable information device 200 cannot display an operation screen based on page display information, the MFP 100 transmits an image of an operation screen in which contents are arranged with a display mode defined by a predetermined condition in a variable region in the operation screen to the portable information device 200 without transmitting the page display information to a remote operation device. Therefore, even in the case where the browsing program is not installed in the remote information device 200, a remote operation can be executed by the portable information device 200.

Further, in the case where an operation screen same as an operation screen determined at a first time point is determined at a second time point that is before a predetermined time period has elapsed since page display information including a description to describe a display of the operation screen determined at the first time point is produced in the portable information device 200, the MFP 100 transmits the page display information produced at the first time point to the portable information device without producing the page display information. Therefore, the number of times of production of the page display information can be reduced, and a load of a process can be reduced.

Further, in the case where receiving an image of an operation screen, the portable information device 200 in the modified example transmits first operation information including position information designated by the user in the image of the operation screen to the MFP 100. In the case where receiving page display information, the portable information device 200 in the modified example transmits second operation information including a set of variable information and position information indicating a position in the image of the operation screen to the MFP 100 based on variable information and the position information indicating a position in the image of the operation screen. In the case where receiving the first operation information, the MFP 100 in the modified example specifies an operation based on a position defined by the position information included in the first operation information in the image of the operation screen. In the case where receiving the second operation information, the MFP 100 specifies an operation based on a position defined by the position information included in the second operation information in the image of the operation screen after a variable region in the operation screen is changed based on the variable information included in the second operation information. Therefore, whether transmitting an image of an operation screen or transmitting page display information, the MFP 100 can specify an operation by the user who operates a remote operation device.

Further, in the case where a position designated by the user in an image of an operation screen is outside of a variable region, the portable information device 200 in the modified example outputs first operation information. In the case where a position designated by the user in the image of the operation screen is inside of the variable region, the portable information device 200 in the modified example outputs second operation information. Thus, the number of times, which the MFP 100 receives the second operation information, is reduced, so that a process can be simplified.

In the foregoing embodiment, the MFP 100 is specified as one example of a remote control apparatus. It is needless to say that the present invention can be regarded as a remote control method of allowing the MFP 100 to execute the remote control process shown in FIGS. 10 and 11 or FIGS. 15 and 16, a remote control program that allows the CPU 111 controlling the MFP 100 to execute the remote control method, a remote operation method of allowing a portable information device to execute the remote operation process shown in FIG. 12 or 17 and a remote operation program that allows the CPU 201 controlling the portable information device 200 to perform the remote operation method.

Although the present invention has been described and illustrated in detail, it is clearly understood that the same is by way of illustration and example only and is not to be taken by way of limitation, the spirit and scope of the present invention being limited only by the terms of the appended claims.

Appendix (1) The remote control apparatus according to claim 1, wherein the contents are images having a size larger than the variable region and of which a display part displayed in the variable region in the image changes.

(2) The remote control apparatus according to claim 1, wherein the contents are video images.

(3) The contents have an amount of data larger than a region other than the variable region.

(4) The remote control apparatus according to claim 9, wherein the first transmitting portion is configured to, in the case where it is determined to be impossible in the ability determining portion and the determined operation screen includes the variable region, transmit the produced image of an operation screen to the remote operation device every time a display mode of the variable region in the image of the operation screen produced in the operation screen producing portion changes.

What is claimed is:

1. A remote control apparatus capable of being remotely controlled by a remote operation device, comprising:
   a communicator configured to communicate with the remote operation device;
      a hardware processor configured to determine an operation screen to be transmitted to the remote operation device, and
      in the case where the determined operation screen includes contents of which a display mode is capable of changing in a variable region predetermined in the operation screen, produce page display information including a description to describe a display of the determined operation screen with the display mode of the contents being capable of changing,
   a first transmitter configured to, in the case where the determined operation screen does not include the variable region, transmit an image of the determined operation screen to the remote operation device, and
   a second transmitter configured to, in the case where the determined operation screen includes the variable region, transmit the produced page display information to the remote operation device.

2. The remote control apparatus according to claim 1, the remote operation device comprising:
   a display that displays an image;
   a remote-side controller; and
   a transmitter, wherein
   the remote-side controller includes:
   a hardware processor configured to:
      in the case where receiving the image of the operation screen, determine first operation information that includes position information indicating a position designated by a user in the image of the operation screen displayed in the display, and
      in the case where receiving the page display information, produce an image of an operation screen based on the page display information, display the produced image of the operation screen in the display, accept an operation input by the user with respect to the displayed image of the operation screen, and determine a command corresponding to the accepted operation, and
      control the transmitter to transmit the first operation information or second operation information including the determined command to the remote control apparatus, and
   wherein the hardware processor included in the remote control apparatus is further configured to:
      in the case where receiving the first operation information, specify an operation based on a position defined by the position information included in the first operation information in the image of the operation screen, and
      in the case where receiving the second operation information, specify an operation based on the page display information and the command included in the received second operation information.

3. The remote control apparatus according to claim 1, the remote operation device comprising:
a display that displays an image;
a remote-side controller; and
a transmitter, wherein
the remote-side controller includes:
a hardware processor configured to:
in the case where receiving the image of the operation screen, determine first operation information including position information indicating a position designated by a user in the image of the operation screen displayed in the display,
in the case where receiving the page display information, produce an image of an operation screen based on the page display information, display the produced image of the operation screen in the display, accept an operation input by the user with respect to the displayed image of the operation screen, and determine a command corresponding to the accepted operation,
determine second operation information including a set of variable information indicating a state in which a display mode of the variable region in the operation screen is changed and position information indicating a position in an image of an operation screen after the display mode of the variable region is changed based on the page display information and the command determined by the page display control portion, and
control the transmitter to transmit the first operation information or the second operation information to the remote control apparatus, and
wherein the hardware processor included in the remote control apparatus is further configured to:
in the case where receiving the first operation information, specify an operation based on a position defined by position information included in the first operation information in the image of the operation screen, and
in the case where receiving the second operation information, specify an operation based on a position defined by position information included in the second operation information in the image of the operation screen after the variable region in the operation screen is changed based on variable information included in the second operation information.

4. The remote control apparatus according to claim 3, wherein
the hardware processor included in the remote-side controller is configured to specify a position designated by the user in an image of the operation screen, output the first operation information in the case where the specified position is outside of the variable region, and output the second operation information in the case where the specified position is inside of the variable region.

5. The remote control apparatus according to claim 1, wherein
the hardware processor included in the remote control apparatus is further configured to:
from an operation screen including the variable region, acquire a fixed portion including a description to describe a display of a fixed region other than the variable region,
acquire data included in the contents, and produce page display information based on the acquired data and the fixed portion.

6. The remote control apparatus according to claim 5, wherein
the hardware processor included in the remote control apparatus is configured to acquire the fixed portion from a storage common to another remote control apparatus.

7. The remote control apparatus according to claim 5, wherein
the hardware processor included in the remote control apparatus is configured to acquire data from another remote control apparatus.

8. The remote control apparatus according to claim 1, wherein
the hardware processor included in the remote control apparatus is further configured to give an instruction to display an operation screen based on page display information to the remote operation device.

9. The remote control apparatus according to claim 1, wherein
the hardware processor included in the remote control apparatus is further
configured to:
determine whether the remote operation device is capable of displaying an operation screen based on page display information, and
in the case where the determined operation screen includes the variable region, produce an image of an operation screen in which the contents are arranged in the variable region in the operation screen with a display mode defined by a predetermined condition,
the first transmitter is configured to, in the case where it is determined to be impossible by the ability determining portion, transmit the image of the operation screen produced by the hardware processor included in the remote control apparatus to the remote operation device even if the determined operation screen includes the variable region, and
the second transmitter is configured not to, in the case where it is determined to be impossible by the hardware processor included in the remote control apparatus, transmit the produced page display information to the remote operation device.

10. The remote control apparatus according to claim 1, wherein
in the case where an operation screen same as an operation screen determined at a first time point is determined at the second time point before a predetermined time period has elapsed since page display information, which includes a description to describe a display of the operation screen determined at the first time point as an operation screen transmitted to the remote operation device, is produced, the hardware processor included in the remote control apparatus is configured not to produce page display information including a description to describe a display of an operation screen determined at a second time point.

11. The remote control apparatus according to claim 1, wherein the hardware processor included in the remote control apparatus is configured to:
produce an operation screen by arranging the data in a mode defined by a mode specific information in the variable region specified by position information,
produce an operation screen where a display mode of the variable region is changed, or produce an operation screen by arrangement of contents in a format defined by data description language.

12. A remote control method performed by a remote control apparatus capable of being remotely controlled by a remote operation device, including:
   an operation screen determination step of determining an operation screen transmitted to the remote operation device;
   a page display information production step of, in the case where the determined operation screen includes contents of which the display mode is capable of changing in a variable predetermined region in the operation screen, producing page display information including a description to describe a display of the determined operation screen with the display mode of contents being capable of changing;
   a first transmission step of, in the case where the determined operation screen does not include the variable region, transmitting the image of the determined operation screen to the remote operation device; and
   a second transmission step of, in the case where the determined operation screen includes the variable region, transmitting the produced page display information to the remote operation device.

13. A non-transitory computer-readable recording medium encoded with a remote control program, wherein
   the remote control program allows a computer that controls a remote control apparatus capable of being remotely controlled by a remote operation device to perform following steps,
   the steps comprising:
   an operation screen determination step of determining an operation screen to be transmitted to the remote operation device;
   a page display information production step of, in the case where the determined operation screen includes contents of which the display mode is capable of changing in a variable region predetermined in the operation screen, producing page display information including a description to describe a display of the determined operation screen with a display mode of the contents being capable of changing;
   a first transmission step of, in the case where the determined operation screen does not include the variable region, transmitting the image of the determined operation screen to the remote operation device; and
   a second transmission step of, in the case where the determined operation screen includes the variable region, transmitting the produced page display information to the remote operation device.

14. The non-transitory computer-readable recording medium encoded with the remote control program according to claim 13,
   the remote operation device comprising:
   a display that displays an image; and
   a remote-side controller, wherein
   the remote-side controller includes
   a hardware processor configured to:
      in the case where receiving the image of the operation screen, determine first operation information that includes position information indicating a position designated by a user in the image of the operation screen displayed in the display,
      in the case where receiving the page display information, produce an image of an operation screen based on the page display information, display the produced image of the operation screen in the display, accept an operation input by the user with respect to the displayed image of the operation screen, and determine a command corresponding to the accepted operation, and
   an operation transmitter configured to transmit the first operation information or second operation information including the determined command to the remote control apparatus, and
   the remote control program further allows the computer to perform
   a first operation specifying step of, in the case where receiving the first operation information, specifying an operation based on a position defined by the position information included in the first operation information in the image of the operation screen, and
   a second operation specifying step of, in the case where receiving the second operation information, specifying an operation based on the page display information and the command included in the received second operation information.

15. The non-transitory computer-readable recording medium encoded with the remote control program according to claim 13,
   the remote operation device comprising:
   a display that displays an image; and
   a remote-side controller, wherein
   the remote-side controller includes
   a hardware processor configured to:
      in the case where receiving the image of the operation screen, determine first operation information including position information indicating a position designated by a user in the image of the operation screen displayed in the display,
      in the case where receiving the page display information, produce an image of an operation screen based on the page display information, display the produced image of the operation screen in the display, accept an operation input by the user with respect to the displayed image of the operation screen, and determine a command corresponding to the accepted operation,
      determine second operation information including a set of variable information indicating a state in which a display mode of the variable region in the operation screen is changed and position information indicating a position in an image of an operation screen after the display mode of the variable region is changed based on the page display information and the command determined by the included in the remote-side controller, and
   an operation transmitter configured to transmit the first operation information or the second operation information to the remote control apparatus, and
   the remote control program further allows the computer to perform:
   a first operation specifying step of, in the case where receiving the first operation information, specifying an operation based on a position defined by position information included in the first operation information in the image of the operation screen, and
   a second operation specifying step of, in the case where receiving the second operation information, specifying an operation based on a position defined by position information included in the second operation information in the image of the operation screen after the variable region in the operation screen is changed based on variable information included in the second operation information.

16. The non-transitory computer-readable recording medium encoded with the remote control program according to claim 15,
the hardware processor included in the remote-side controller is configured to specify a position designated by the user in an image of the operation screen, output the first operation information in the case where the specified position is outside of the variable region, and output the second operation information in the case where the specified position is inside of the variable region.

17. The non-transitory computer-readable recording medium encoded with the remote control program according to claim 13, further allowing the computer to perform
a fixed portion acquisition step configured to, from an operation screen including the variable region, acquire a fixed portion including a description to describe a display of a fixed region other than the variable region, and
a data acquisition step configured to acquire data included in the contents, wherein
the page display information production step includes a step of producing page display information based on the acquired data and the fixed portion.

18. The non-transitory computer-readable recording medium encoded with the remote control program according to claim 17,
the fixed portion acquisition step includes a step of acquiring the fixed portion from a storage common to another remote control apparatus.

19. The non-transitory computer-readable recording medium encoded with the remote control program according to claim 17,
wherein the data acquisition step includes a step of acquiring data from another remote control apparatus.

20. The non-transitory computer-readable recording medium encoded with the remote control program according to claim 13, further allowing the computer to perform a switch instruction step of giving an instruction to display an operation screen based on page display information to the remote operation device.

21. The non-transitory computer-readable recording medium encoded with the remote control program according to claim 13, further allowing the computer to perform
an ability determination step of determining whether the remote operation device is capable of displaying an operation screen based on page display information, and
an operation screen production step of, in the case where the determined operation screen includes the variable region, producing an image of an operation screen in which the contents are arranged in the variable region in the operation screen with a display mode defined by a predetermined condition, wherein
the first transmission step includes a step of, in the case where it is determined to be impossible in the ability determining step, transmitting the image of the operation screen produced in the operation screen production step to the remote operation device even if the determined operation screen includes the variable region, and
the second transmission step includes a step of, in the case where it is determined to be impossible in the ability determining step, not transmitting the produced page display information to the remote operation device.

22. The non-transitory computer-readable recording medium encoded with the remote control program according to claim 13,
in the case where an operation screen same as an operation screen determined at a first time point is determined at the second time point before a predetermined time period has elapsed since page display information, which includes a description to describe a display of the operation screen determined at the first time point as an operation screen transmitted to the remote operation device, is produced, the page display information production step includes a step of not producing page display information including a description to describe a display of an operation screen determined at a second time point.

* * * * *